United States Patent
Miyashita et al.

(10) Patent No.: US 7,869,338 B2
(45) Date of Patent: Jan. 11, 2011

(54) POSITION DETECTION DEVICE, POSITION DETECTION METHOD, POSITION DETECTION CONTROL DEVICE, POSITION DETECTION CONTROL METHOD, POSITION DETECTION CONTROL PROGRAM, ACCESS AUTHENTICATION DEVICE, ACCESS AUTHENTICATION METHOD, ACCESS AUTHENTICATION CONTROL DEVICE, ACCESS AUTHENTICATION CONTROL METHOD, ACCESS AUTHENTICATION CONTROL PROGRAM, INFORMATION STORAGE DEVICE, AND OPTICAL DISK

(75) Inventors: Harumitsu Miyashita, Nara (JP); Toyoji Gushima, Osaka (JP); Akira Muto, Osaka (JP); Masaru Yamaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 694 days.

(21) Appl. No.: 11/884,840

(22) PCT Filed: Feb. 21, 2006

(86) PCT No.: PCT/JP2006/303034

§ 371 (c)(1),
(2), (4) Date: Aug. 22, 2007

(87) PCT Pub. No.: WO2006/090691

PCT Pub. Date: Aug. 31, 2006

(65) Prior Publication Data

US 2008/0253251 A1 Oct. 16, 2008

(30) Foreign Application Priority Data

Feb. 24, 2005 (JP) .............................. 2005-049595

(51) Int. Cl.
*G11B 7/00* (2006.01)
(52) U.S. Cl. .................. 369/273; 369/53.21; 369/13.01
(58) Field of Classification Search ................ 369/100, 369/53.1, 53.22, 273, 13.01, 108, 176, 47.1, 369/59.25, 53.21; 740/725
See application file for complete search history.

(56) References Cited

U.S. PATENT DOCUMENTS

| 5,862,117 A | * | 1/1999 | Fuentes et al. | ............... 369/100 |
| 6,198,875 B1 | | 3/2001 | Edenson et al. | |
| 7,223,030 B2 | * | 5/2007 | Fessler et al. | .................. 400/76 |

(Continued)

FOREIGN PATENT DOCUMENTS

EP 0 849 734 6/1998

(Continued)

*Primary Examiner*—Nabil Z Hindi
(74) *Attorney, Agent, or Firm*—Wenderoth, Lind & Ponack, L.L.P.

(57) ABSTRACT

A position detection device, a position detection method, a position detection control device, a position detection control method, a position detection control program, an access authentication device, an access authentication method, an access authentication control device, an access authentication control method, an access authentication control program, an information storage device, and an optical disk are provided, all of which make it possible to prevent illegal copying of the information recorded in a recording medium.

An information recording/playback device detects the position on an optical disk of an RFID tag provided to the optical disk, and writes the detected position on the optical disk of the RFID tag into the RFID tag as the position information.

19 Claims, 22 Drawing Sheets

U.S. PATENT DOCUMENTS

| | | | |
|---|---|---|---|
| 7,292,512 B2 * | 11/2007 | Ryal | 369/53.21 |
| 7,443,299 B2 * | 10/2008 | Forster | 340/572.7 |
| 7,492,691 B2 * | 2/2009 | Earhart | 369/103 |
| 7,677,688 B2 * | 3/2010 | Tagawa | 347/19 |

FOREIGN PATENT DOCUMENTS

| | | |
|---|---|---|
| JP | 10-228727 | 8/1998 |
| JP | 10-283271 | 10/1998 |
| JP | 2002-93027 | 3/2002 |
| JP | 2003-58840 | 2/2003 |
| JP | 2003-187524 | 7/2003 |
| JP | 2004-118930 | 4/2004 |

* cited by examiner

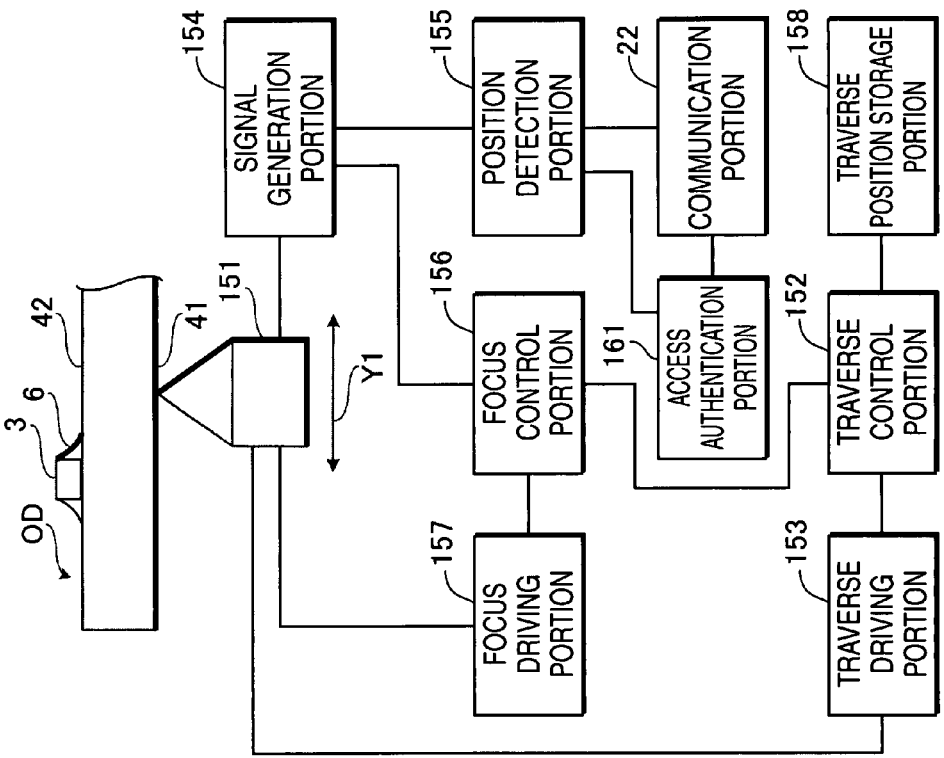
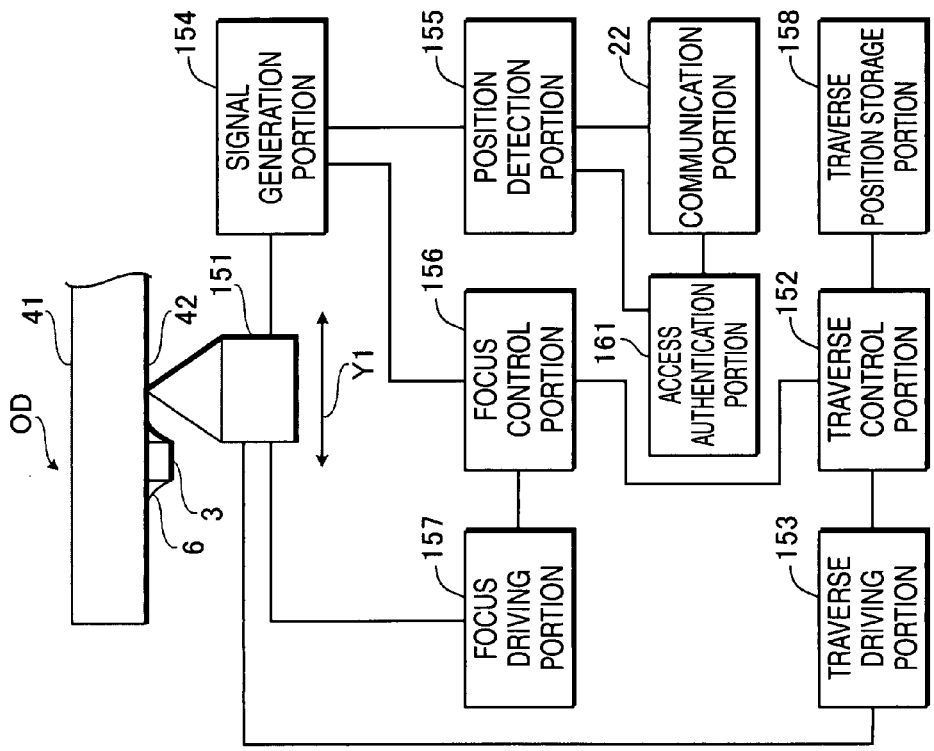

POSITION DETECTION DEVICE, POSITION DETECTION METHOD, POSITION DETECTION CONTROL DEVICE, POSITION DETECTION CONTROL METHOD, POSITION DETECTION CONTROL PROGRAM, ACCESS AUTHENTICATION DEVICE, ACCESS AUTHENTICATION METHOD, ACCESS AUTHENTICATION CONTROL DEVICE, ACCESS AUTHENTICATION CONTROL METHOD, ACCESS AUTHENTICATION CONTROL PROGRAM, INFORMATION STORAGE DEVICE, AND OPTICAL DISK

TECHNICAL FIELD

The present invention relates to a position detection device, a position detection method, a position detection control device, a position detection control method, and a position detection control program, all of which are configured to detect the position of an information storage device provided to a recording medium. Also, the present invention relates to an access authentication device, an access authentication method, an access authentication control device, an access authentication control method, and an access authentication control program, all of which are configured to authenticate access to a recording medium provided with an information storage device. Further, the present invention relates to an information storage device provided to a recording medium. Furthermore, the present invention relates to an optical disk into/from which optical recording information is recorded and/or played back with the use of a laser beam emitted from an optical head.

BACKGROUND ART

A DVD player to play back contents data recorded in an optical disk, such as a DVD-R, has been developed. As an optical disk is loaded by the user, the DVD player plays back contents data recorded therein by reading out the contents data recorded in the form of optical recording information with the use of a laser beam.

Illegal copying of contents data played back in this manner has becoming a problem in recent years. A technique for preventing illegal copying of contents data has been disclosed, for example, in Patent Document 1. According to Patent Document 1, an encryption key is generated according to an identification text set by the user, and the encryption key thus generated is recorded in an optical disk. When information is played back, the encryption key is read out from the optical disk, and the identification text is obtained from the encryption key that has been read out. Meanwhile, the user is requested to input the identification text. Subsequently, the identification text inputted by the user and the identification text obtained from the encryption key are compared with each other, and when they coincide with each other, of the main information recorded in the optical disk, information specified by the encryption key is played back. In this case, the main information (contents data) recorded in the optical disk will not be played back unless the identification text is inputted. It is thus possible to prevent illegal copying of the contents data.

In the case of Patent Document 1 described above, however, the identification text needs to be inputted each time the content data is played back, and it is, quite a bothersome work for the user to input the identification text. In addition, although it is not easy to manage the identification text, should the user forget the identification text, the contents data can no longer be played back.

Patent Document 1: JP-A-10-283271

SUMMARY OF THE INVENTION

The invention was devised to solve the problems discussed above, and therefore has an object to provide a position detection device, a position detection method, a position detection control device, a position detection control method, a position detection control program, an access authentication device, an access authentication method, an access authentication control device, an access authentication control method, an access authentication control program, an information storage device, and an optical disk, all of which make it possible to prevent illegal copying of the information recorded in a recording medium.

A position detection device according to one aspect of the invention includes position detection means for detecting a position on a recording medium of an information storage device provided to the recording medium, and position information writing means for writing the position on the recording medium of the information storage device detected by the position detection means into the information storage device as position information.

A position detection method according to another aspect of the invention includes a position detecting step of detecting a position on a recording medium of an information storage device provided to the recording medium, and a position information writing step of writing the position on the recording medium of the information storage device detected in the position detecting step into the information storage device as position information.

According to these configurations, the position on the recording medium of the information storage device provided to the recording medium is detected, and the detected position on the recording medium of the information storage device is written into the information storage device as the position information.

Because the position on the recording medium of the information storage device provided to the recording medium is detected and the detected position on the recording medium of the information storage device is written into the information storage device as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

An access authentication device according to still another aspect of the invention is an access authentication device that authenticates access to a recording medium provided with an information storage device, and the information storage device has stored position information specifying a position on the recording medium at which the information storage device is disposed. The access authentication device includes: position detection means for detecting the position on the recording medium at which the information storage device is disposed; position information read means for reading out the position information from the information storage device;

judgment means for judging whether the position detected by the position detection means coincides with the position information read out by the position information read means; and access permission means for permitting access to the recording medium when it is judged that the detected position coincides with the position information that has been read out.

An access authentication method according to still another aspect of the invention is an access authentication method for authenticating access to a recording medium provided with an information storage device, and the information storage device has stored position information specifying a position on the recording medium at which the information storage device is disposed. The access authentication method includes: a position detecting step of detecting the position on the recording medium at which the information storage device is disposed; a position information reading step of reading out the position information from the information storage device; a judging step of judging whether the position detected in the position detecting step coincides with the position information read out in the position information reading step; and an access permitting step of permitting access to the recording medium when it is judged that the detected position coincides with the position information that has been read out.

According to these configurations, the information storage device has stored the position information specifying the position on the recording medium at which the information storage device is disposed. The position on the recording medium at which the information storage device is disposed is detected and the position information is read out from the information storage device. Whether the detected position coincides with the position information that has been read out is judged. When it is judged that the detected position coincides with the position information that has been read out, access to the recording medium is permitted.

Because access to the recording medium is not permitted when it is judged that the detected position does not coincide with the position information that has been read out, for example, even when the information storage device provided to the recording medium is removed and laminated to another recording medium having stored a copy of the information recorded in the recording medium, access to the recording medium fails unless the laminated position coincides with the position information. It is thus possible to prevent illegal copying of the information recorded in the recording medium.

An information storage device according to still another aspect of the invention includes position information acquisition means for acquiring position information detected by a position detection device that detects a position on a recording medium of the information storage device laminated to the recording medium from the position detection device, and position information storage means for storing the position information acquired by the position information acquisition means.

According to this configuration, the position information detected by the position detection device that detects the position on the recording medium of the information storage device laminated to the recording medium is acquired from the position detection device, and the acquired position information is stored.

Because the position on the recording medium of the information storage device provided to the recording medium is stored in the information storage device as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

An optical disk according to still another aspect of the invention has an information storage device that is embedded therein at a pre-set position, and the information storage device includes position information storage means for having previously stored position information on the optical disk of the information storage device.

According to this configuration, because the information storage device is embedded in the optical disk at the pre-set position, and the information storage device has previously stored the position information on the optical disk of the information storage device, by using this position information in the access authentication for the recording medium, it is possible to prevent illegal copying of the information recorded in the optical disk. For example, when the information recorded in an optical disk, in which the information storage device is embedded, is copied into another optical disk and an attempt is made to access the copied optical disk, access to the optical disk fails because the information storage device is not embedded therein. It is thus possible to prevent illegal copying of the information recorded in the optical disk.

A position detection control device according to still another aspect of the invention includes position detection instruction means for providing an instruction to detect a position on a recording medium of an information storage device provided to the recording medium, and position information writing instruction means for providing an instruction to write the position on the recording medium of the information storage device detected according to the instruction into the information storage device as position information.

A position detection control method according to still another aspect of the invention includes a position detection instructing step of providing an instruction to detect a position on a recording medium of an information storage device provided to the recording medium, and a position information writing instructing step of providing an instruction to write the position on the recording medium of the information storage device detected according to the instruction into the information storage device as position information.

A position detection control program according to still another aspect of the invention causes a computer to function as position detection instruction means for providing an instruction to detect a position on a recording medium of an information storage device provided to the recording medium, and position information writing instruction means for providing an instruction to write the position on the recording medium of the information storage device detected according to the instruction into the information storage device as position information.

According to these configurations, an instruction to detect the position on the recording medium of the information storage device provided to the recording medium is provided, and an instruction to write the detected position on the recording medium of the information storage device into the information storage device as the position information is provided.

Because an instruction to detect the position on the recording medium of the information storage device provided to the recording medium is provided and an instruction to write the detected position on the recording medium of the information storage device into the information storage device as the position information is provided, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

An access authentication control device according to still another aspect of the invention is an access authentication control device that authenticates access to a recording medium provided with an information storage device, and the information storage device has stored position information specifying a position on the recording medium at which the information storage device is disposed. The access authentication control device includes: detected position input means into which is inputted a detected position when the position on the recording medium at which the information storage device is disposed is detected; position information input means into which is inputted the position information read out from the information storage device; judgment means for judging whether the detected position inputted into the detected position input means coincides with the position information inputted into the position information input means; and access permission means for permitting access to the recording medium when it is judged that the detected position coincides with the position information.

An access authentication control method according to still another aspect of the invention is an access authentication control method for authenticating access to a recording medium provided with an information storage device, and the information storage device has stored position information specifying a position on the recording medium at which the information storage device is disposed. The access authentication control method includes: a detected position inputting step of inputting a detected position when the position on the recording medium at which the information storage device is disposed is detected; a position information inputting step of inputting the position information read out from the information storage device; a judging step of judging whether the detected position inputted in the detected position inputting step coincides with the position information inputted in the position information inputting step; and an access permitting step of permitting access to the recording medium when it is judged that the detected position coincides with the position information in the judging step.

An access authentication control program according to still another aspect of the invention is an access authentication control program for authenticating access to a recording medium provided with an information storage device, and the information storage device has stored position information specifying a position on the recording medium at which the information storage device is disposed. The access authentication control program causes a computer to function as follows: detected position input means into which is inputted a detected position when the position on the recording medium at which the information storage device is disposed is detected; position information input means into which is inputted the position information read out from the information storage device; judgment means for judging whether the detected position inputted into the detected position input means coincides with the position information inputted into the position information input means; and access permission means for permitting access to the recording medium when the judgment means judges that the detected position coincides with the position information.

According to these configurations, the information storage device has stored the position information specifying the position on the recording medium at which the information storage device is disposed. The position on the recording medium at which the information storage device is disposed is detected, and the detected position is inputted. Subsequently, the position information read out from the information storage device is inputted. Whether the detected position coincides with the position information is judged, and when it is judged that the detected position coincides with the position information, access to the recording medium is permitted.

Because access to the recording medium is not permitted when the detected position does not coincide with the position information, for example, even when the information storage device provided to the recording medium is removed and laminated to another recording medium having stored a copy of the information recorded in the recording medium, access to the recording medium fails unless the laminated position coincides with the position information. It is thus possible to prevent illegal copying of the information recorded in the recording medium.

According to the invention, because the position on the recording medium of the information storage device provided to the recording medium is detected, and the detected position on the recording medium of the information storage device is written into the information storage device as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

The objects, features, and advantages of the invention will become more apparent with detailed description below and the accompanying drawings.

BRIEF DESCRIPTION OF THE DRAWINGS

FIG. 17 is a view used to describe position detection processing of the RFID tag according to the first modification of the third embodiment.

DETAILED DESCRIPTION OF THE INVENTION

Figure 1:
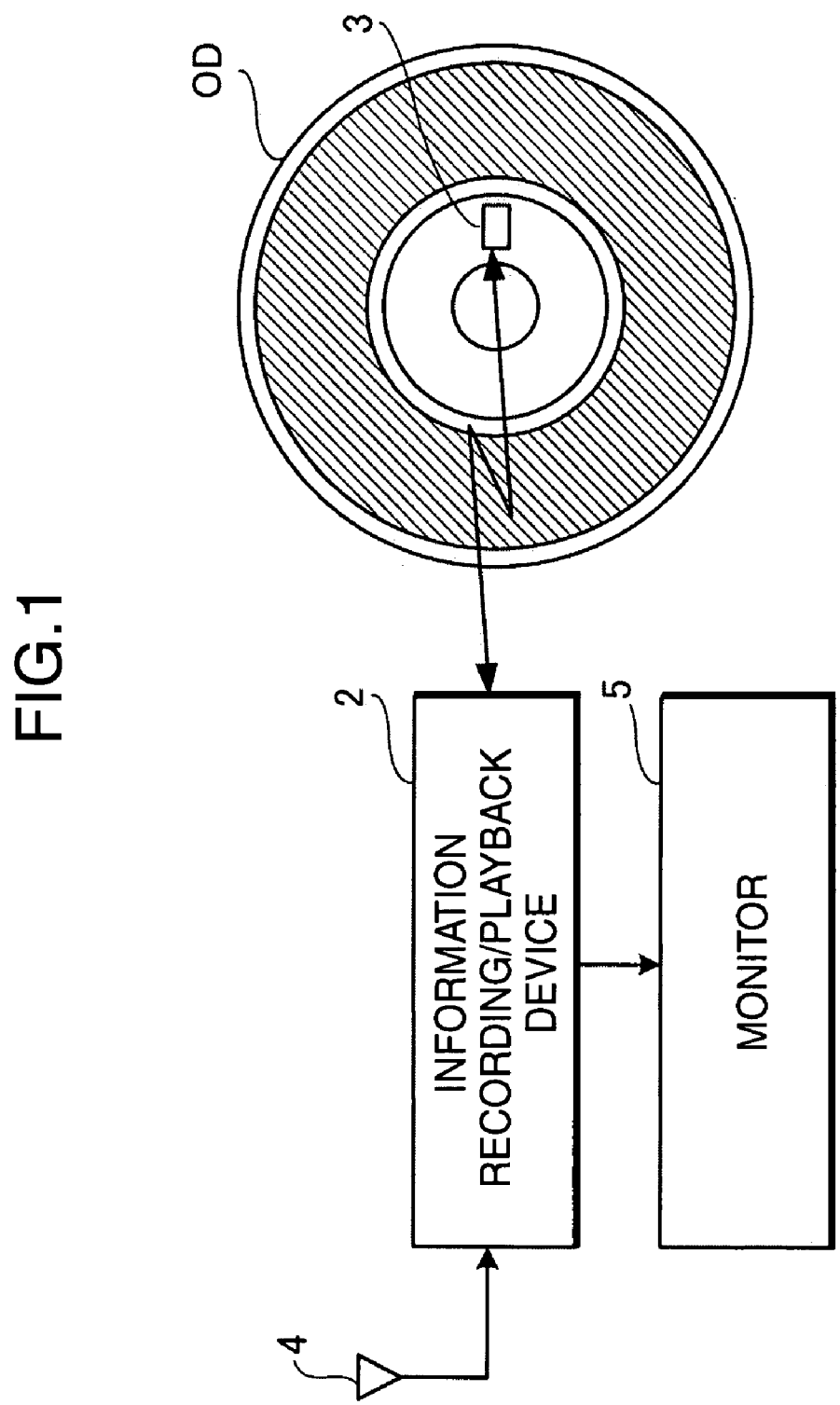
FIG. 1 is a view schematically showing the configuration of an optical disk information access system according to a first embodiment of the invention.
Figure 2:
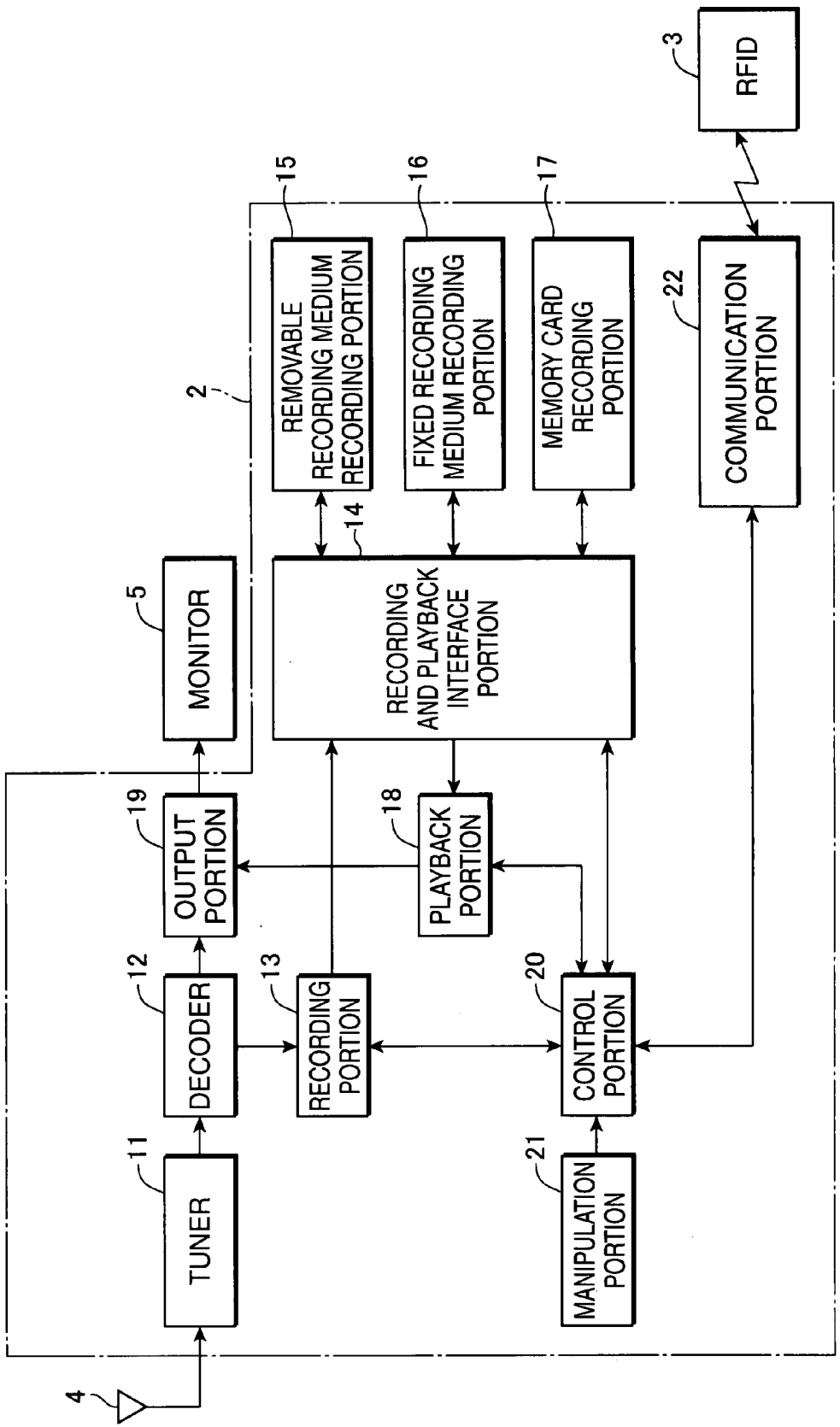
FIG. 2 is a block diagram showing the internal configuration of an information recording/playback device shown in FIG. 1.
Figure 3:
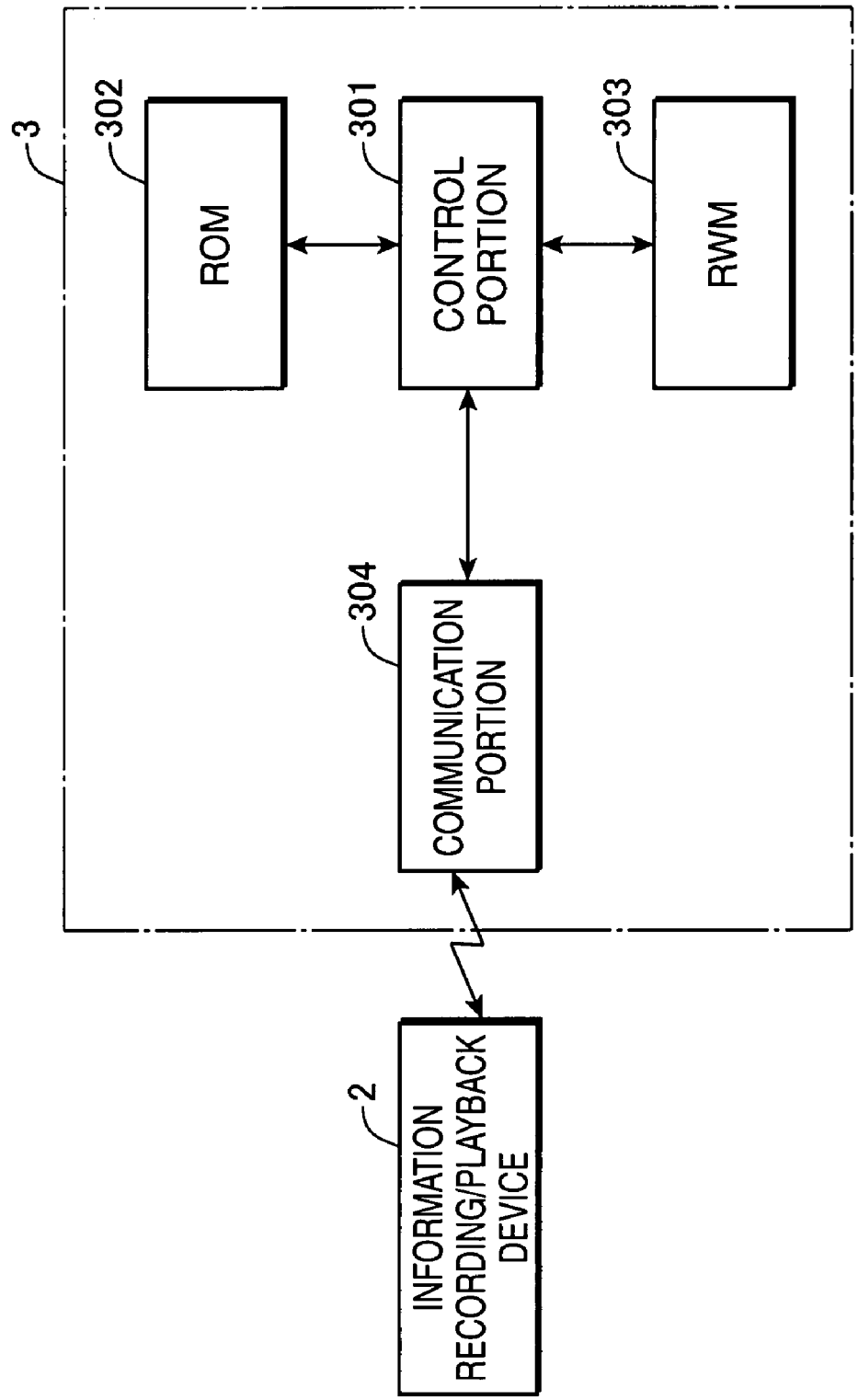
FIG. 3 is a block diagram showing the internal configuration of an RFID tag shown in FIG. 1.

Hereinafter, an optical disk information access system (recording medium information access system) according to each embodiment of the invention will be described with reference to the drawings. FIG. 1 is a view schematically showing the configuration of the optical disk information access system according to a first embodiment of the invention. FIG. 2 and FIG. 3 are block diagrams showing the concrete configuration of the optical disk information access system shown in FIG. 1.

The optical disk information access system shown in FIG. 1 comprises an information recording/playback device 2, an RFID (Radio Frequency Identification) tag 3, an antenna 4, and a monitor 5. The RFID tag 3 is provided to an optical disk OD. The information recording/playback device 2 and the RFID tag 3 are connected to each other by a wireless method to enable communications. The antenna 4 receives radio waves transmitted from a broadcast station and outputs contents data of a program or the like to the information recording/playback device 2. In this specification, the contents data is simply referred to as "contents" on occasion. The information recording/playback device (for example, DVD recorder) 2 that records and/or plays back optical recording information using a laser beam records the contents data received via the antenna 4 in a removable recording medium or a fixed recording medium. The monitor 5 displays thereon the contents played back by the information recording/playback device 2, thereby presenting the contents to the user.

FIG. 2 is a block diagram showing the internal configuration of the information recording/playback device 2 shown in FIG. 1. The information recording/playback device 2 shown in FIG. 2 comprises a tuner 11, a decoder 12, a recording portion 13, a recording and playback interface portion 14, a removable recording medium recording portion 15, a fixed recording medium recording portion 16, a memory card recording portion 17, a playback portion 18, an output portion 19, a control portion 20, a manipulation portion 21, and a communication portion 22.

The tuner 11 is connected to the antenna 4, and extracts program data in a channel the user has chosen through the manipulation portion 21 from the broadcast radio waves received at the antenna 4, and outputs the program data to the decoder 12. In this specification, the program data is simply referred to as "program" on occasion. The decoder 12 is used upon receipt of a program by digital TV broadcasting to decode the program received in the form of compressed and encoded data, and outputs the resulting data to the recording portion 13 and the output portion 19. The output portion 19 outputs the program to the monitor 5 for the program to be displayed thereon.

The recording portion 13 controls recording operations by outputting the contents to the removable recording medium recording portion 15, the fixed recording medium recording portion 16, and the memory card recording portion 17 via the recording and playback interface portion 14. For example, a DVD drive is used as the removable recording medium recording portion 15, a hard disk drive is used as the fixed recording medium recording portion 16, and a memory card reader and writer is used as the memory card recording portion 17. Also, as the removable recording medium for recording use, optical disks, such as a DVD-RAM, a DVD-R, a CD-RW, a CD-R, a PD (Phase change rewritable Disk), and a Blu-ray Disk, are used. As the fixed recording medium, a hard disk or the like is used, and as the memory card, an SD (Secure Digital) memory card or the like comprising a semiconductor memory or the like is used. As the removable recording medium for playback use, in addition to the optical disks specified above, for example, a DVD-ROM, a CD-ROM, and the like are used. It should be noted that the recording portions provided to the information recording/playback device 2 are not particularly limited to the examples above, and various modifications are possible.

The manipulation portion 21 accepts a manipulation instruction from the user and outputs this instruction to the control portion 20. For example, the manipulation portion 21 accepts a playback instruction of contents recorded in an optical disk and outputs this instruction to the control portion 20. In this embodiment, an input of a playback instruction from the user may be accepted at a remote controller accompanying the information recording/playback device 2.

The playback portion 18 controls playback operations by receiving the contents played back by the removable recording medium recording portion 15, the fixed recording medium recording portion 16, and the memory card recording portion 17 via the recording and playback interface portion 14 and outputting the contents to the output portion 19. The recording and playback interface portion 14 interfaces the recording portion 13, the playback portion 18, the removable recording medium recording portion 15, the fixed recording medium recording portion 16, and the memory card recording portion 17 with respect to one another.

The control portion 20 comprises a micro processor or the like provided with a ROM (Read Only Memory), a RAM (Random Access Memory), and the like, and controls operations of the recording portion 13, the recording and playback interface portion 14, the playback portion 18, the manipulation portion 21, and the communication portion 22. The communication portion 22 comprises an antenna, a communication circuit, and the like, and performs two-way transmission and reception of various kinds of information with the RFID tag 3 by a wireless method.

FIG. 3 is a block diagram showing the internal configuration of the RFID tag 3 shown in FIG. 1. The RFID tag 3 comprises a control portion 301, a ROM 302, a RWM (Re-Writable Memory) 303, and a communication portion 304.

The RFID tag 3 is embedded in the inner peripheral portion (clamp region) outside the optical recording information region (a shaded portion shown in FIG. 1) of the optical disk OD, and comprises a storage medium using a non-contact IC chip and an antenna-embedded plate (tag). As the optical disk OD, various optical recording media, such as a DVD-RW, a DVD+RW, a DVD-RAM, a BD (Blu-ray Disc), and an HD DVD, can be used. As the RFID tag 3, for example, a non-contact IC chip available from Hitachi, Ltd. known as "μ-chip® RW" can be used. The invention, however, is not particularly limited to this example, and other RFID chips can be used as well. Alternatively, the RFID tag is not necessarily embedded in an optical disk, and a seal-type RFID tag may be laminated to the surface of an optical disk.

The control portion 301 comprises a CPU or the like, and it controls operations of the communication portion 304 and also controls operations of the ROM 302 and the RWM 303 according to a control instruction or the like received via the communication portion 304. The ROM 302 has previously stored specific, non-rewritable information that can only be read out, for example, information indicating the kind of optical disk (CD, DVD, BD or the like), information that varies from optical disk to optical disk (serial number or the like), essential information to play back optical recording information recorded in the optical disk (disk navigation information, a program, a system file, etc.) at the time of manufacturing. The RWM 303 stores specific, rewritable information, for example, information about the number of playback times indicating how many times the optical recording information recorded in the optical disk has been played back. The communication portion 304 comprises an antenna, a communication circuit, and the like, and performs two-way transmission and reception of various kinds of information with the information recording/playback device 2 by a wireless method.

The specific information recorded in the RWM 303 is not particularly limited to the examples specified above, and program information (for example, the title, a total length of play time, the cast, a brief description of the content, date of creation, date and hour of recording) indicating the contents recorded in the optical disk OD may be recorded.

The information recording/playback device 2 of this embodiment is configured to record information into an optical disk and/or play back information from an optical disk. The invention, however, is not particularly limited to this configuration, and it may be a device that only plays back information from an optical disk (for example, a DVD player or the like). In this case, the antenna 4, the tuner 11, the decoder 12, the recording portion 13, etc. are omitted.

In this embodiment, the information recording/playback device 2 corresponds to one example of the information recording/playback device, and the RFID tag 3 corresponds to one example of the information storage device. Also, the ROM 302 and the RWM 303 correspond to one example of storage means in the information storage device. In addition, the control portion 20 and the communication portion 22 correspond to one example of read means, playback means, update means, and specifying means in the information recording/playback device.

Figure 4:
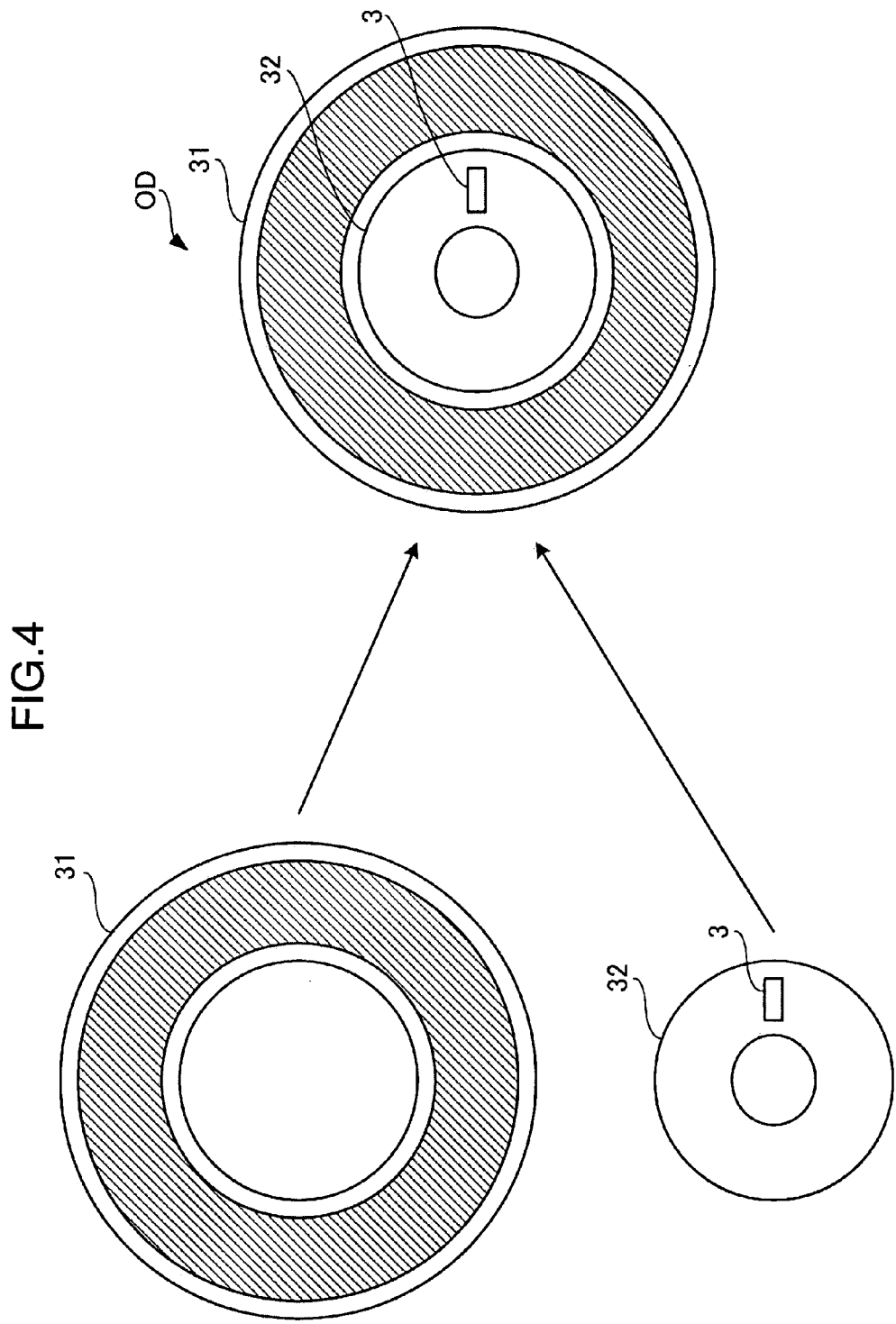
FIG. 4 is a view used to describe an optical disk of the invention.

The optical disk OD according to the invention will now be described. FIG. 4 is a view used to describe an optical disk of the invention. As is shown in FIG. 4, the optical disk OD of the invention comprises two members: a recording member 31 and a clamp member 32. The recording member 31 includes a recording region to record contents data (optical recording information), such as programs, movies, and music. The clamp member 32 includes a region (clamp region) from the inner peripheral portion of the recording region in which optical recording information has been recorded to the center hole made at the center of the optical disk. The clamp member 32 is used to fix the optical disk OD for the optical disk OD to rotate, and is configured to be attachable to/detachable from the recording member 31. When the clamp member 32 is attached to the recording member 31, the clamp member 32 is used as a portion pinched and held by a disk holding mechanism of the removable recording medium recording portion 15. The clamp member 32 therefore functions as the reference plane of the disk with respect to the optical system when the optical disk OD is placed on the turn table and held by the clamper. The recording member 31 and the clamp member 32 are brought into engagement by an engaging member, and the recording member 31 and the clamp member 32 are rotated as one body by the spindle motor. As has been described, the RFID tag 3 is provided to the clamp member 32. It should be noted that the optical recording information recorded in the recording member 31 does not contain playback information essential to play back the optical recording information. This playback information is stored in the RFID tag 3.

The clamp member 32 in this embodiment is of a toroidal shape concentric with the optical disk OD. The invention, however, is not particularly limited to this configuration, and the clamp member 32 may be of a shape such that the outer peripheral portion engages with the recording member 31. In this case, the engaging member used to bring the recording member 31 and the clamp member 32 into engagement can be omitted. This enables the optical disk OD to rotate while preventing the recording member 31 and the clamp member 32 from sliding with respect to each other.

As has been described, the optical disk OD into/from which the optical recording information is recorded and/or played back with the use of a laser beam includes the recording member 31 having recorded the optical recording information and the clamp member 32 attachable to/detachable from the recording member 31. The clamp member 32 includes the RFID tag 3 having stored the playback information essential to play back the optical recording information.

In order to play back the optical recording information, it is therefore necessarily required to have both the recording member 31 having recorded the optical recording information and the clamp member 32 provided with the RFID tag 3 having stored the playback information essential to play back the optical recording information, and the optical recording information cannot be played back without these two components. Hence, even when the optical recording information recorded in the recording member 31 is copied into another optical disk, it cannot be played back without the clamp member 32. It is thus possible to prevent illegal copying of the optical recording information recorded in the optical disk.

Also, because the attaching/detaching member is formed of the clamp region portion from the inner peripheral portion of the recording region in which the optical recording information has been recorded to the center hole made at the center of the optical disk OD, it is possible to rotate the optical disk OD while maintaining balance by attaching this clamp region portion to the recording member 31.

Figure 5:
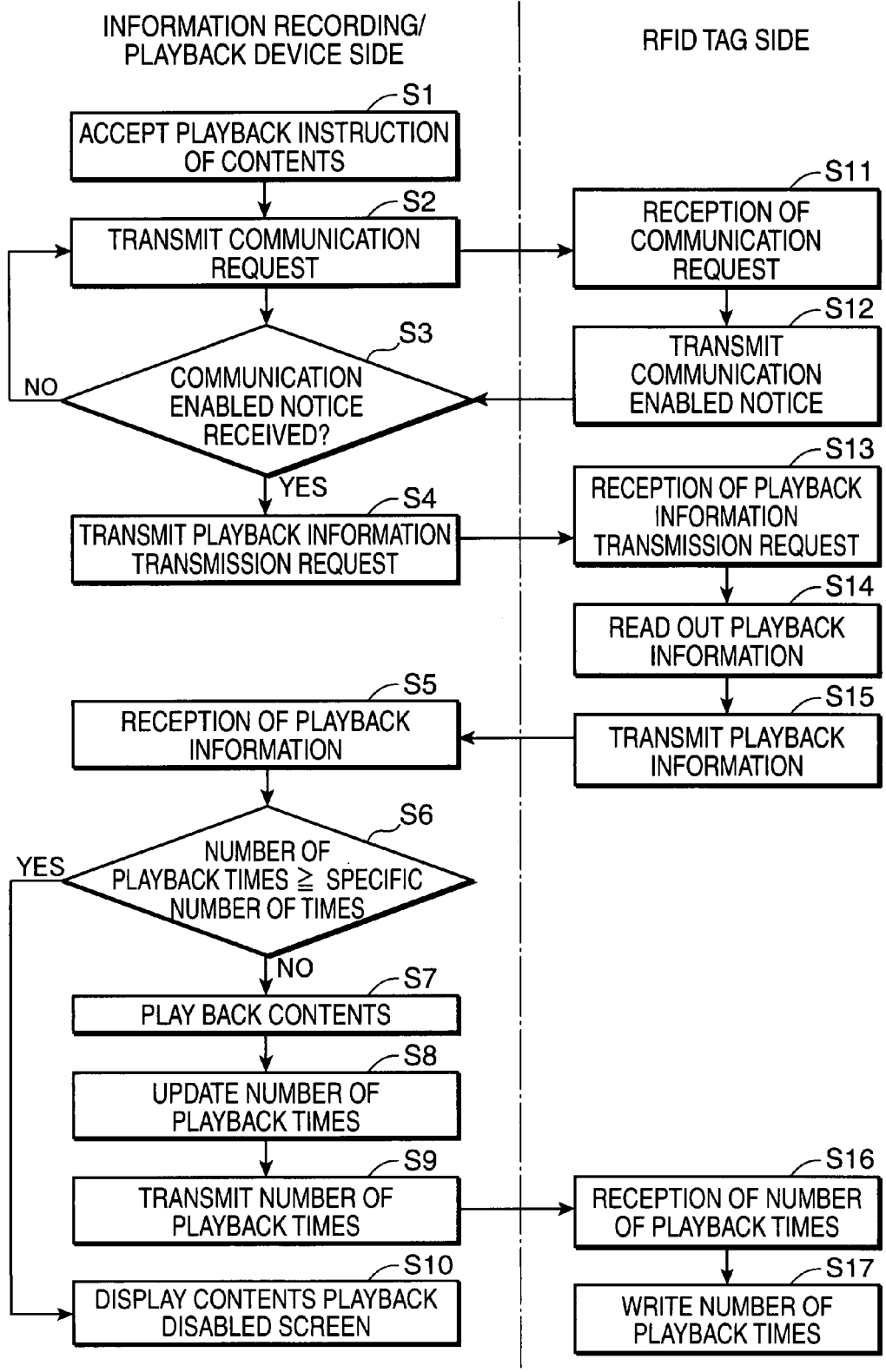
FIG. 5 is a flowchart used to describe one example of information playback processing in the optical disk information access system shown in FIGS. 1 through 3.

Information playback processing in the optical disk information access system configured as has been described will now be described. FIG. 5 is a flowchart used to describe one example of information playback processing in the optical disk information access system shown in FIG. 1 through FIG. 3. In the following description, assume that the optical disk OD, in which the clamp member 32 is attached to the recording member 31, has been already loaded in the information recording/playback device 2.

Initially, when the user inputs a playback instruction of the contents using specific input keys in the manipulation portion 21 of the information recording/playback device 2, the control portion 20 of the information recording/playback device 2 accepts the playback instruction from the user via the manipulation portion 21 in Step S1.

Subsequently, in Step S2, the control portion 20 of the information recording/playback device 2 instructs the communication portion 22 to transmit a communication request to request a communication enabled notice, and the communication portion 22 transmits the communication request to the RFID tag 3. Subsequently, in Step S3, the control portion 20 judges whether the communication portion 22 has received the communication enabled notice. In a case where the communication enabled notice has not been received, the control portion 20 returns to Step S2 to transmit a communication request again. In a case where the communication enabled notice has been received, the control portion 20 proceeds to the processing in Step S4.

When the positional relation between the communication portion 22 of the information recording/playback device 2 and the RFID tag 3 falls outside a communication enabled range, the RFID tag 3 is not able to receive the communication request from the information recording/playback device 2, and is therefore not able to transmit the communication enabled notice. In this case, the control portion 20 of the information recording/playback device 2 judges that the communication enabled notice has not been received, and returns to the processing in Step S2.

On the contrary, when the positional relation between the information recording/playback device 2 and the RFID tag 3 falls within the communication enabled range, the communication portion 304 of the RFID tag 3 receives the communication request and outputs this request to the control portion 301 in Step S11. Subsequently, in Step S12, the control portion 301 instructs the communication portion 304 to transmit a communication enabled notice to notify that the RFID tag 3 is in a communication enabled state, and the communication portion 304 transmits the communication enabled notice to the information/playback device 2. In this case, the control portion 20 of the information recording/playback device 2 judges that the communication enabled notice has been received, and proceeds to the processing in Step S4.

In a case where the communication enabled notice is received, in Step S4, the control portion 20 instructs the communication portion 22 to transmit a playback information transmission request, and the communication portion 22 transmits the playback information transmission request to the RFID tag 3.

Subsequently, in Step S13, the communication portion 304 of the RFID tag 3 receives the playback information transmission request and outputs this request to the control portion 301. Subsequently, in Step S14, the control portion 301 reads out the playback information stored in the ROM 302. In a case where part of the playback information (for example, the information about the number of playback times) is stored in the RWM 303, the control portion 301 reads out this part of the playback information stored in the RWM 303. Subsequently, in Step S15, the control portion 301 instructs the communication portion 304 to transmit the playback information, and the communication portion 304 transmits the playback information to the information recording/playback device 2.

Subsequently, in Step S5, the communication portion 22 of the information recording/playback device 2 receives the playback information and outputs this information to the control portion 20. Subsequently, in Step S6, the control portion 20 judges whether the number of playback times contained in the playback information is equal to or exceeds a pre-stored specific number of times. The specific number of times may be pre-stored in the ROM of the control portion 20. Alternatively, it may be pre-stored in the ROM 302 of the RFID tag 3 so that it is transmitted to the information recording/playback device 2 while being contained in the playback information, or it may be pre-stored in the optical disk OD to be read out from the optical disk OD. Upon judging that the number of playback times is equal to or exceeds the specific number of times (YES in Step S6), the control portion 20 proceeds to the processing in Step S10. Upon judging that the number of playback times is less than the specific number of times (NO in Step S6), the control portion 20 proceeds to the processing in Step S7.

Upon judging that the number of playback times is equal to or exceeds the specific number of times, in Step S10, the control portion 20 controls the monitor 5 to display a contents playback disabled screen notifying that the contents recorded in the optical disk OD cannot be played back.

On the contrary, upon judging that the number of playback times is less than the specific number of times, in Step S7, the control portion 20 controls the recording and playback interface portion 14 and the playback portion 18 to play back the contents recorded in the optical disk OD according to the playback information. It should be noted that the optical recording information recorded in an optical disk contains plural kinds of contents, and the playback information contains information to play back particular contents alone among these plural kinds of contents. The control portion 20 therefore specifies the contents among those recorded in the optical disk OD according to the playback information for the specified contents to be played back.

Subsequently, in Step S8, the control portion 20 updates the number of playback times when the playback of the contents starts. To be more concrete, the control portion 20 updates the number of playback times by incrementing the number by one. Subsequently, in Step S9, the control portion 20 instructs the communication portion 22 to transmit the updated number of playback times, and the communication portion 22 transmits this number of playback times to the RFID tag 3.

Subsequently, in Step S16, the communication portion 304 of the RFID tag 3 receives the number of playback times and outputs this number to the control portion 301. Subsequently, in Step S17, the control portion 301 writes the number of playback times transmitted from the information recording/playback device 2 into the RWM 303.

In a case where the number of playback times is not limited for the contents, the processing in Steps S6, S8 through S10, S16, and S17 can be omitted.

As has been described, the playback information essential to play back the optical recording information has been stored in the ROM 302 or the RWM 303 of the RFID tag 3. The playback information is read out from the ROM 302 or the RWM 303 by the control portion 20 of the information recording/playback device 2, and the optical recording information recorded in the optical disk OD is played back according to the playback information that has been read out.

In order to play back the optical recording information, it is therefore necessary to read out the playback information essential to play back the optical recording information from the RFID tag 3, which makes it impossible to play back the optical recording information without the RFID tag 3. Hence, even when the optical recording information recorded in the optical disk OD is copied into another optical disk, it cannot be played back without the RFID tag 3. It is thus possible to prevent illegal copying of the optical recording information recorded in the optical disk OD. In addition, because it is no longer necessary to input the authentication text (password) as was required in the related art, ease of manipulation for the user can be enhanced.

In a case where the optical recording information is played back, the number of playback times stored in the RWM 303 is updated. The optical recording information is no longer played back when the number of playback times has reached the specific number of times. It is therefore possible to limit the number of playback times.

Further, the playback information essential to play back particular contents alone among plural kinds of contents is stored in the ROM 302 of the RFID tag 3, and the particular contents alone are played back according to the playback information that has been read out. Hence, even when plural kinds of contents are recorded in a single optical disk, contents cannot be played back without the RFID tag 3 having stored the playback information corresponding to the respective kinds of contents. The user possessing an optical disk OD having recorded plural kinds of contents is therefore allowed to play back desired contents by obtaining only the RFID tag 3 that enables the desired contents to be played back.

For example, the recording member 31 having recorded plural kinds of contents may be distributed at no charge, and the user purchases or checks out the clamp member 32 that enables the desired contents to be played back among plural kinds of contents. This eliminates the need to manufacture an optical disk for each kind of contents, which can in turn reduce the manufacturing costs by mass-producing the recording members 31 having recorded plural kinds of contents.

The optical disk information access system according to a second embodiment of the invention will now be described. Currently, optical disks of plural standards are available in the market, and there is a possibility that the market in the future will be flooded with optical disks of many more standards. In order to play optical disks of different standards, a playback device conforming to the respective standards is necessary, and the device is required to have compatibility. It is, however, almost impossible to manufacture a playback device that conforms to all the standards. The second embodiment therefore achieves an optical disk information access system that conforms to several standards.

Because the configuration of the optical disk information access system of the second embodiment is the same as the configuration of the optical disk information access system of the first embodiment described above, descriptions thereof are omitted. Herein, operations of the optical disk information access system of the second embodiment will be described.

Figure 6:
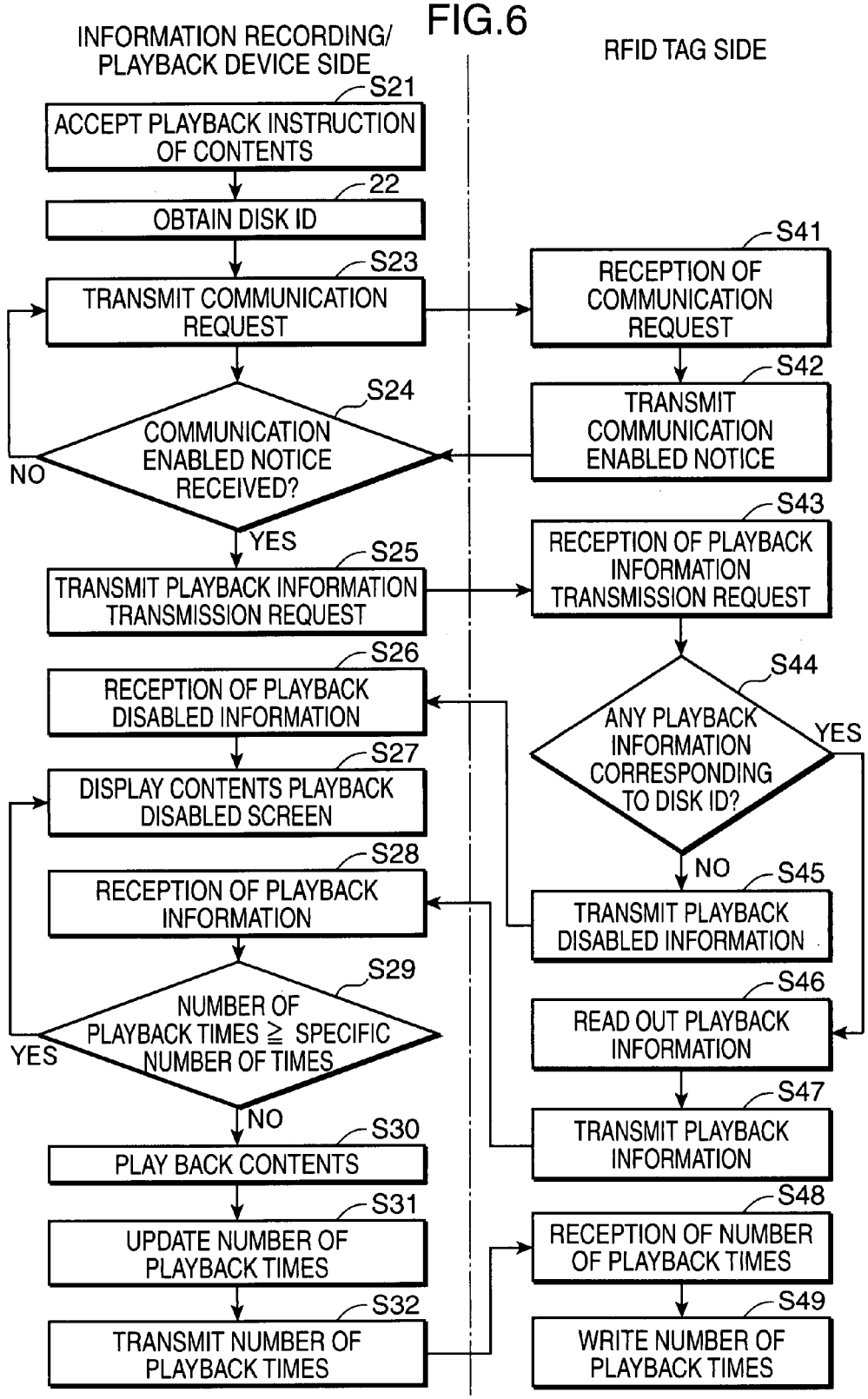
FIG. 6 is a flowchart used to describe one example of the information playback processing in an optical disk information access system of a second embodiment.

FIG. 6 is a flowchart used to describe one example of information playback processing in the optical disk information access system of the second embodiment. In the following description, assume that the optical disk OD, in which the clamp member 32 is attached to the recording member 31, has been already loaded in the information recording/playback device 2. Because processing in Step S21 is the same as the processing in Step S1 shown in FIG. 5, descriptions of this step are omitted.

Subsequently, in Step S22, the control portion 20 controls the recording and playback interface portion 14 and the removable recording medium recording portion 15 to read and obtain a disk ID recorded in the BCA (Burst Cutting Area) in the optical disk OD to identify an individual optical disk.

Because processing in Step S23, S24, S41, and S42 is the same as the processing in Step S2, S3, S11, and S12, respectively, shown in FIG. 5, descriptions of these steps are omitted.

Subsequently, in Step S25, the control portion 20 instructs the communication portion 22 to transmit a playback information transmission request, and the communication portion 22 transmits the playback information transmission request to the RFID tag 3. The playback information transmission request contains the disk ID read out from the optical disk OD.

Subsequently, in Step S43, the communication portion 304 of the RFID tag 3 receives the playback information transmission request and outputs this request to the control portion 301.

Subsequently, in Step S44, the control portion 301 judges whether the playback information corresponding to the disk ID contained in the received playback information transmission request is stored in the ROM 302. Plural kinds of playback information corresponding to disk ID's of plural optical disks of different standards are stored in the ROM 302 of the RFID tag 3. Upon judging that the playback information corresponding to the disk ID is not stored therein (NO in Step S44), the control portion 301 proceeds to processing in Step S45. Upon judging that the playback information corresponding to the disk ID is stored therein (YES in Step S44), the control portion 301 proceeds to processing in Step S46.

Upon judging that the playback information corresponding to the disk ID is not stored, in Step S45, the control portion 301 instructs the communication portion 304 to transmit playback disabled information, and the communication portion 304 transmits the playback disabled information to the information recording/playback device 2. The playback disabled information is the information informing the absence of the playback information corresponding to the received disk ID (it has not been stored).

Subsequently, in Step S26, the communication portion 22 of the information recording/playback device 2 receives the playback disabled information and outputs this information to the control portion 20. Subsequently, in Step S27, the control portion 20 controls the monitor 5 to display a contents playback disabled screen notifying that the contents recorded in the optical disk OD cannot be played back.

On the contrary, upon judging that the playback information corresponding to the disk ID is stored, in Step S46, the control portion 301 reads out the playback information corresponding to the received disk ID among plural kinds of playback information stored in the ROM 302. In a case where part of the playback information (for example, information about the number of playback times) is stored in the RWM 303, the control portion 301 reads out part of the playback information corresponding to the received disk ID from this part of the playback information stored in the RWM 303. Subsequently, in Step S47, the control portion 301 instructs the communication portion 304 to transmit the playback information, and the communication portion 304 transmits the playback information to the information recording/playback device 2.

Subsequently, in Step S28, the communication portion 22 of the information recording/playback device 2 receives the playback information and outputs this information to the control portion 20. Subsequently, in Step S29, the control portion 20 judges whether the number of playback times contained in the playback information is equal to or exceeds a pre-stored specific number of times. Upon judging that the number of playback times is equal to or exceeds the specific number of times (YES in Step S29), the control portion 20 proceeds to the processing in Step S27. Upon judging that that the number of playback times is less than the specific number of times (NO in Step S29), the control portion 20 proceeds to the processing in Step S30.

Because processing in Steps S30 through S32, S48, and S49 is the same as the processing in Steps S7 through S9, S16, and S17, respectively, shown in FIG. 5, descriptions of these steps are omitted.

As has been described, plural kinds of playback information corresponding to disk ID's (equivalent to identification information) assigned to individual optical disks of different standards are stored in the ROM 302 of the RFID tag 3. The disk ID unique to the optical disk OD loaded in the drive is obtained by the information recording/playback device 2, and the playback information corresponding to the obtained disk ID is read out from the ROM 302 of the RFID tag 3. The optical recording information is then played back according to the playback information that has been read out. It is thus possible to play back optical recording information recorded in plural optical disks of different standards using a single RFID tag 3. In particular, the compatibility can be readily maintained when the market is flooded with optical disks of a variety of standards.

For example, two recording members 31 of different standards having stored the same contents, and a clamp member 32 attachable to/detachable from these two recording members 31 are sold in a set. In this case, the user as the purchaser is allowed to play back the contents recorded in the recording member 31 by combining either of the recording members 31 of the standards according to which playback is enabled by the information recording/playback device he possesses and the clamp member 32.

Each embodiment above has described a case where the information recording/playback device, such as a DVD recorder, plays back the contents data, such as programs, movies, and music. The invention, however, is not particularly limited to this case, and application data, such as software, may be played back (read out). In this case, the information recording/playback device may comprise a personal computer or the like.

Figure 7:
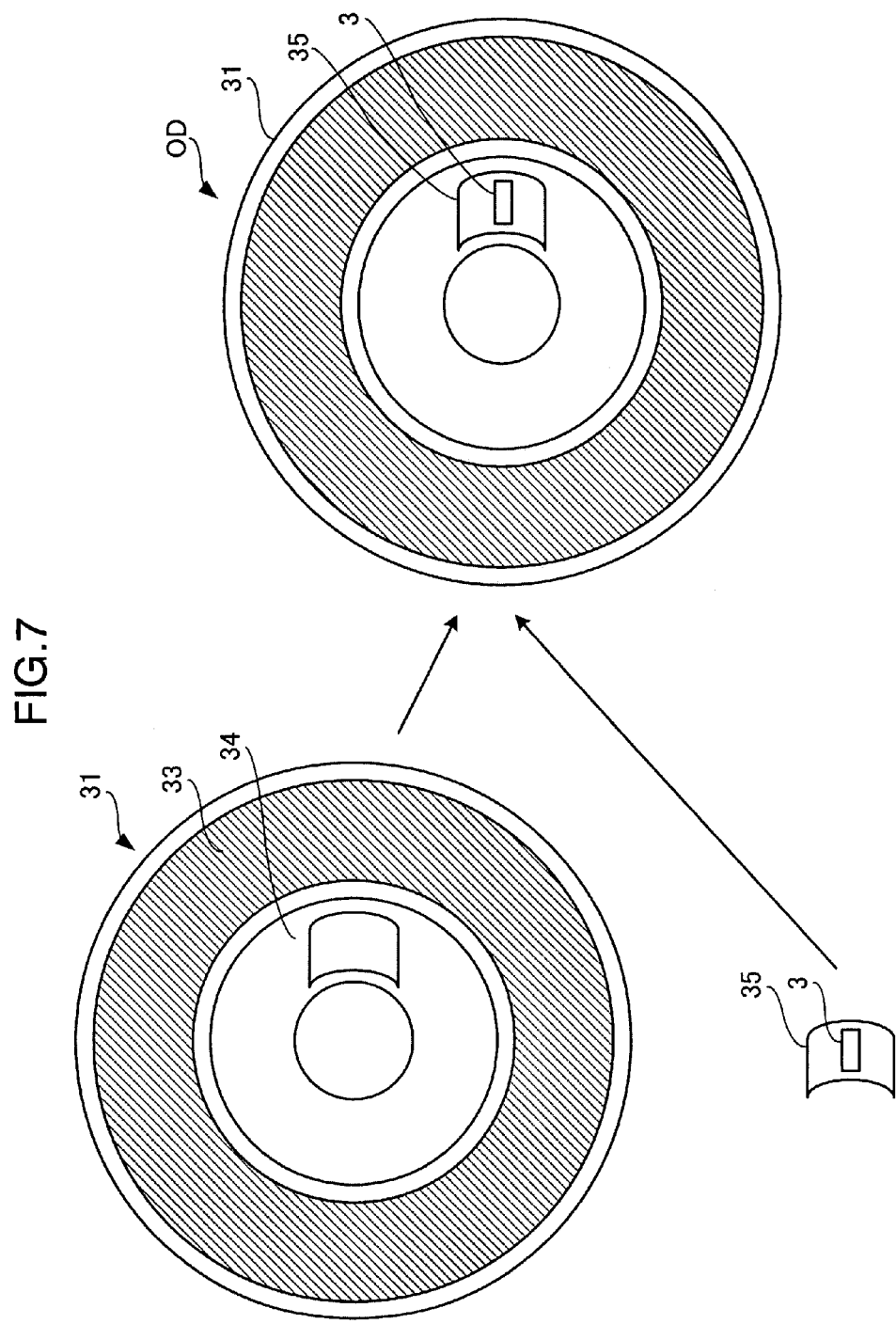
FIG. 7 is a view used to describe an optical disk according to a first modification.

Modifications of the optical disk of the invention will now be described. The optical disk of the first embodiment and the second embodiment is configured in such a manner that the clamp member 32, which corresponds to the clamp region portion from the inner peripheral portion of the recording region in which the optical recording information has been recorded to the center hole made at the center of the optical disk, is made attachable/detachable, and the RFID tag 3 is provided to the clamp member. The invention, however, is not particularly limited to this configuration, and the optical disk may be configured in such a manner that part of the clamp region portion from the inner peripheral portion of the recording region in which the optical recording information has been recorded to the center hole made at the center of the optical disk on either one side from the center line of the optical disk is made attachable/detachable, and the RFID tag 3 is provided to part of the clamp region. FIG. 7 is a view used to describe an optical disk according to a first modification.

As is shown in FIG. 7, in the first modification of the invention, the optical disk OD comprises two members: a recoding member 31 having a recording region 33 to record optical recording information and a clamp region 34 from the inner peripheral portion of the recording region in which the optical recording information has been recorded to the center hole made at the center of the optical disk, and an attaching/detaching member 35 attachable to/detachable from part of the clamp region 34 on either one side from the center line of the optical disk. A hole of a specific shape is formed in the clamp region 34 of the recording member 31 on either one side from the center line of the optical disk OD, and the attaching/detaching member 35 is fit into this hole. The recording member 31 and the attaching/detaching member 35 are therefore rotated as one body by the spindle motor. The RFID tag 3 is provided to the attaching/detaching member 35. The shape of the hole in the clamp region 34 and the shape of the attaching/detaching member 35 are not limited to the examples shown in FIG. 7, and they can be of other shapes.

As has been described, the attaching/detaching member attachable to/detachable from the recording member is formed of part of the clamp region 34 from the inner peripheral portion of the recording region in which the optical recording information has been recorded to the center hole made at the center of the optical disk. It is therefore possible to rotate the optical disk OD while preventing the recording member 31 and the attaching/detaching member 35 from sliding with respect to each other by attaching this part of the clamp region 34 to the clamp region 34.

Figure 8:
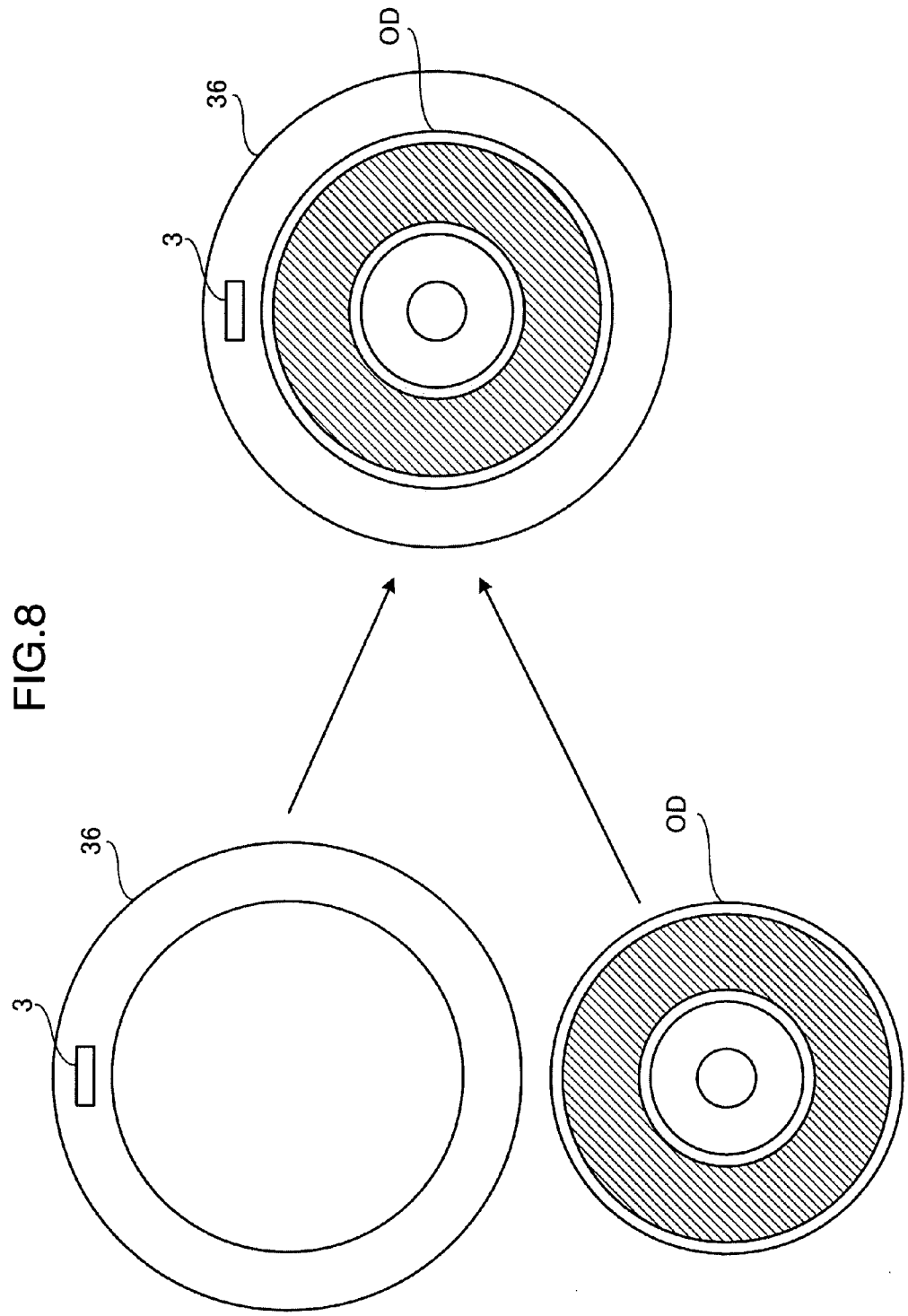
FIG. 8 is a view used to describe an optical disk according to a second modification.

The RFID tag 3 may be provided to the adapter attached to the optical disk OD on the outer peripheral side. FIG. 8 is a view used to describe an optical disk according to a second modification.

For example, in a case where the diameter of the optical disk that can be read by the information recording/playback device 2 is 12 cm, and the diameter of the disk to be read is 8 cm, then an adapter 36 is attached to the optical disk on the outer peripheral side. As is shown in FIG. 8, according to the second modification of the invention, the RFID tag 3 is provided to the adapter 36 attached to the optical disk OD on the outer peripheral side. The user attaches the adapter 36 provided with the RFID tag 3 to the optical disk OD, and loads the optical disk OD in the information recording/playback device 2. As has been described, because the attaching/detaching member is the adapter 36 attached to the optical disk OD on the outer peripheral side, it is possible to play back the optical recording information by attaching the adapter 36 to the optical disk OD.

Figure 9:
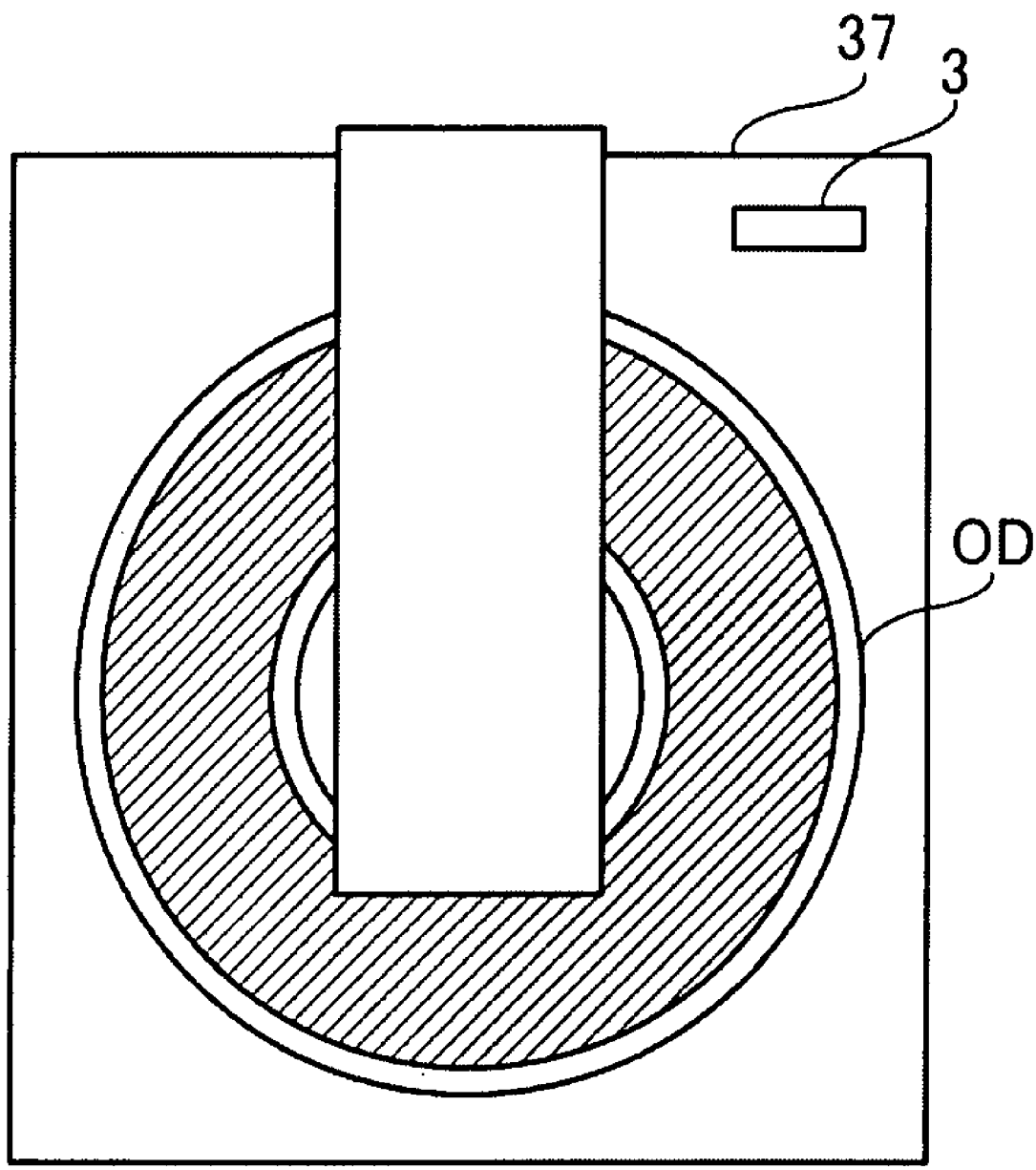
FIG. 9 is a view used to describe an optical disk according to a third modification.

Further, the RFID tag 3 may be provided to a cartridge accommodating the optical disk OD. FIG. 9 is a view used to describe an optical disk according to a third modification.

As is shown in FIG. 9, according to the third modification of the invention, the RFID tag 3 is provided to a cartridge 37 accommodating the optical disk OD. FIG. 9 shows a case where the RFID tag 3 is provided to the upper right end portion of the cartridge 37; however, the RFID tag 3 may be provided to another portion of the cartridge 37, such as the upper left end portion, the lower right end portion, and the lower left end portion. Although the cartridge 37 is attachable to/detachable from the recording member (the optical disk OD), they do not necessarily come into contact with each other. As has been described, because the attaching/detaching member is the cartridge 37 that accommodates the optical disk OD, it is possible to play back the optical recording information by attaching the cartridge 37 to the optical disk OD.

The optical disk OD of the invention can be used as patient's medical records in a hospital or the like. For example, data of the patient's medical records is recorded in the recording member 31, and the clamp member 32 provided with the RFID tag 3 having recorded the playback information essential to play back the data of patient's medical records is held by the patient personally or in the hospital. In this case, because the clamp member 32 provided with the RFID tag 3 that enables playback of the data of patient's medical records recorded in the recording member 31 is held by the patient personally, private information can be secured, which in turn makes it possible to manage access to the private information.

The embodiment is applicable to a recording medium other than the optical disk described above, for example, to a semiconductor memory. In such a case, a card adapter provided with the RFID tag is attached to a Mini SD memory card. Alternatively, this embodiment may be applied to a recording medium or a magnetic recording medium in which information is recorded with the use of an electronic beam instead of a laser beam.

The embodiments described concretely as above chiefly include inventions having the configurations as follows.

A recording medium information access system according to one aspect of the invention includes an information recording/playback device that records information into a recording medium and/or plays back information from the recording medium, and an information storage device provided to the recording medium, wherein the information storage device includes storage means for storing access information needed to access the information, and wherein the information recording/playback device includes read means for reading out the access information from the storage means, and access means for recording and/or playing back the information into/from the recording medium according to the access information read out by the read means.

According to this configuration, the access information needed to access the information is stored in the storage means of the information storage device. The access information is read out from the storage means by the read means of the information recording/playback device, and the information is recorded into and/or played back from the recording medium by the access means according to the access information that has been read out.

In order to access the information, it is therefore necessary to read out the access information needed to access the information from the information storage device. Access to the information therefore fails without the information storage device. Hence, even when the information recorded in the recording medium is copied, access fails without the information storage device. It is therefore possible to prevent illegal copying of the information recorded in the recording medium. In addition, because it is no longer necessary to input an authentication text as was required in the related art, ease of manipulation for the user can be enhanced.

It is preferable for the recording medium information access system described above that: the access information contains the number of access times specifying how many times access has been made to the information; the information recording/playback device further includes update means for updating the number of access times stored in the storage means when access is made to the information by the access means; and the access means does not make access to the information when the number of access times contained in the access information read out by the read means has reached a specific number of times.

According to this configuration, when access is made to the information by the access means, the number of access times stored in the storage means is updated. Because access to the information is no longer allowed when the number of access times has reached the specific number of times, it is possible to limit the number of access times.

It is preferable for the recording medium information access system described above that: the information contains plural kinds of contents data; the storage means stores access information needed to access particular contents data alone among the plural kinds of contents data; the read means reads out the access information from the storage means; and the access means makes access to the particular contents data according to the access information read out by the read means.

According to this configuration, the storage means stores the access information needed to access particular contents data alone among plural kinds of contents data, and access is made to the particular contents data alone according to the access information read out by the read means. Hence, even when plural kinds of contents data are stored in a single recording medium, access to the contents data fails without the information storage device having stored the access information corresponding to the respective kinds of contents data. The user possessing a recording medium having stored plural kinds of contents data is therefore allowed to access desired contents data by obtaining only the information storage device that enables access to be made to the desired contents data.

It is preferable for the recording medium information access system described above that: the storage means stores plural kinds of access information corresponding to identification information assigned individually to plural recording media of different standards; the information contains identification information unique to the recording medium; the information recording/playback device further includes acquisition means for acquiring the identification information from the recording medium; the read means reads out the access information corresponding to the identification information acquired by the acquisition means from the storage means; and the access means makes access to the information according to the access information read out by the read means.

According to this configuration, the storage means stores plural kinds of access information corresponding to identification information assigned individually to plural recording media of different standards. The identification information unique to the loaded recording medium is acquired by the acquisition means of the information recording/playback device, and the access information corresponding to the identification information acquired by the acquisition means is read out from the storage means by the read means. Subsequently, access is made to the information by the access means according to the access information read out by the read means. It is thus possible to access information recorded in plural recording media of different standards with the use of a single information storage device. In particular, the compatibility can be readily maintained when the market is flooded with recording media of a variety of standards.

An optical disk according to another aspect of the invention is an optical disk into/from which optical recording information is recorded and/or played back with the use of a laser beam, including a recording member in which the optical recording information is recorded; and an attaching/detaching member attachable to/detachable from the recording member, wherein the attaching/detaching member includes an information storage device that stores access information needed to access the optical recording information.

According to this configuration, the optical disk into/from which the optical recording information is recorded and/or played back with the use of a laser beam includes the recording member in which the optical recording information is recorded and the attaching/detaching member attachable to/detachable from the recording member. The attaching/detaching member is provided with the information storage device having stored the access information needed to access the optical recording information.

The recording member in which the optical recording information is recorded and the information storage device having stored the access information needed to access the optical recording information are therefore essentially necessary when access is made to the optical recording information, and access to the optical recording information fails without these two components. Hence, even when the optical recording information recorded in the recording member is copied, access fails without the attaching/detaching member. It is therefore possible to prevent illegal copying of the optical recording information recorded in the optical disk.

It is preferable for the optical disk described above that the attaching/detaching member is a regional portion from an inner peripheral portion of a recording region in which the optical recording information has been recorded to a center hole made at a center of the optical disk.

According to this configuration, because the attaching/detaching member is formed of the regional portion from the inner peripheral portion of the recording region in which the optical recording information has been recorded to the center hole made at the center of the optical disk, by attaching this regional portion to the recording member, it is possible to rotate the optical disk while maintaining balance.

It is preferable for the optical disk described above that the attaching/detaching member is part of a regional portion from an inner peripheral portion of a recording region in which the optical recording information has been recorded to a center hole made at a center of the optical disk on either one side from a center line of the optical disk.

According to this configuration, because the attaching/detaching member is formed of part of the regional portion from the inner peripheral portion of the recording region in which the optical recording information has been recorded to the center hole made at the center of the optical disk on either one side from the center line of the optical disk, by attaching this part of the regional portion to the clamp region, it is possible to rotate the optical disk while preventing the recording member and the attaching/detaching member from sliding with respect to each other.

It is preferable for the optical disk described above that the attaching/detaching member is formed of an adapter attached to the optical disk on an outer peripheral side. According to this configuration, because the attaching/detaching member is the adapter attached to the optical disk on the outer peripheral side, it is possible to make access to the optical recording information by attaching the adapter to the recording member.

It is preferable for the optical disk described above that the attaching/detaching member is a cartridge that accommodates the optical disk. According to this configuration, because the attaching/detaching member is formed of the cartridge that accommodates the optical disk, it is possible to make access to the optical recording information by attaching the cartridge to the recording member.

An adapter for a recording medium according to still another aspect of the invention is an adapter for a recording medium attachable to/detachable from a recording medium into/from which information is recorded and/or played back, and includes an engaging member that brings the adapter into engagement with the recording member, and an information storage device that has stored access information needed to access the recording medium.

According to this configuration, because the adapter engages with the recording medium via the engaging member and the access information needed to access the recording medium is stored in the information storage device, it is possible to drive the adapter for a recording medium together with the recording medium while preventing the adapter from falling off from the recording medium. In order to access the recording medium, the adapter for a recording medium provided with the information storage device having stored the access information needed to access the recording medium is essentially required. Hence, even when the information recorded in the recording medium is copied, access to the recording medium fails without the adapter for a recording medium. It is therefore possible to prevent illegal copying of the information recorded in the recording medium.

Figure 10:
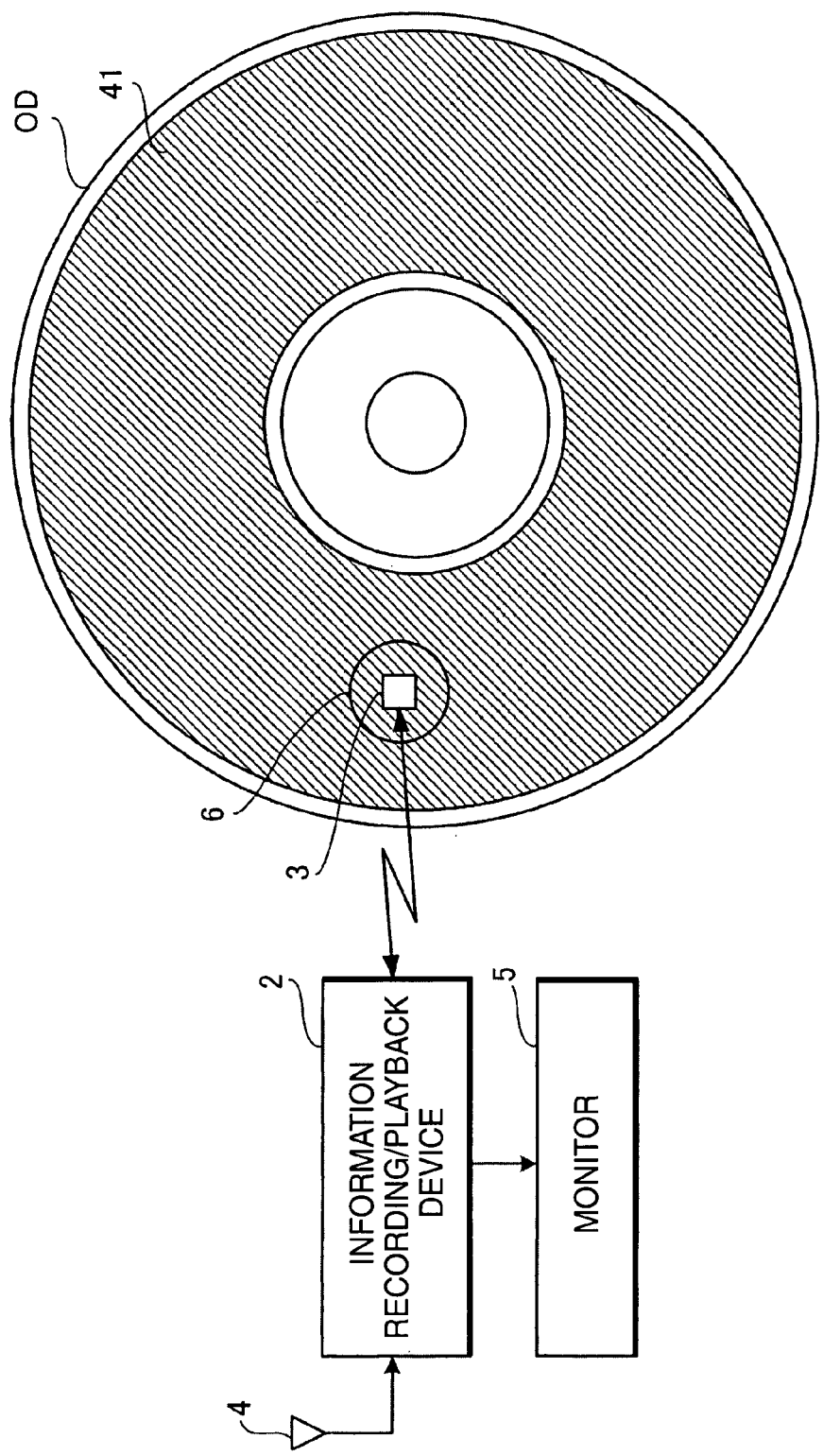
FIG. 10 is a view schematically showing the configuration of an optical disk information access system according to a third embodiment of the invention.

An optical disk information access system according to a third embodiment of the invention will now be described. FIG. 10 is view schematically showing the configuration of the optical disk information access system according to the third embodiment of the invention.

The optical disk information access system shown in FIG. 10 comprises an information recording/playback device 2, an RFID tag 3, an antenna 4, and a monitor 5. The RFID tag 3 is laminated to the optical disk OD on the side of the recording surface 41 with a transparent adhesive seal 6. The user laminates the RFID tag 3 to the optical disk OD at an arbitrary position on the side of the recording surface 41. The information recording/playback device 2 and the RFID tag 3 are connected to each other by a wireless method to enable communications. The antenna 4 receives radio waves transmitted from a broadcast station, and outputs contents data, such as a program, to the information recording/playback device 2. In this specification, the contents data is simply referred to as "contents" on occasion. The information recording/playback device (for example, DVD recorder) 2 that records and/or plays back optical recording information using a laser beam records the contents data received via the antenna 4 in a removable recording medium or a fixed recording medium. The monitor 5 displays thereon the contents played back by the information recording/playback device 2, thereby presenting the contents to the user.

Figure 11:
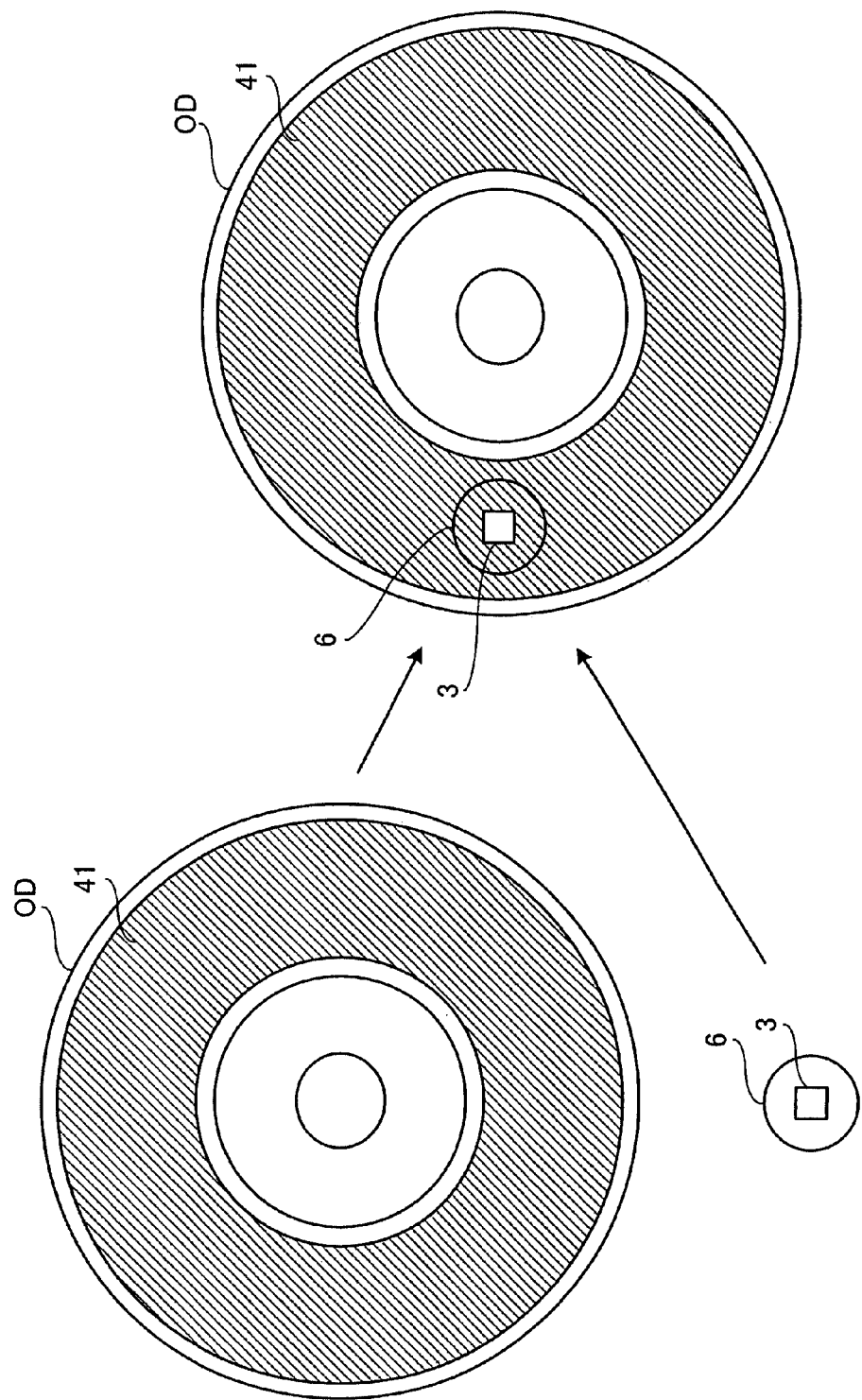
FIG. 11 is a view used to describe an optical disk according to the third embodiment of the invention.

The optical disk OD according to the third embodiment of the invention will now be described. FIG. 11 is a view used to describe the optical disk according to the third embodiment of the invention. As is shown in FIG. 11, the RFID tag 3 is laminated to the optical disk OD on the recording surface 41 with the adhesive seal 6. The optical disk OD includes an optical recording information region (a shaded portion of FIG. 11) to record contents data (optical recording information), such as programs, movies, and music, and the RFID tag 3 is laminated within this optical recording information region.

In this embodiment, the RFID tag 3 is laminated onto the optical disk OD with the transparent adhesive seal 6. The invention, however, is not particularly limited to this configuration, and the RFID tag 3 may be laminated onto the optical disk OD with an opaque adhesive seal 6.

As the optical disk OD of this embodiment, optical disks for recording use, such as a DVD-RAM, a DVD-R, a CD-RW, a CD-R, a PD (Phase change rewritable Disk), and a Blu-ray Disk, and optical disk for playback use, such as a DVD-ROM and a CD-ROM can be used.

Figure 12:
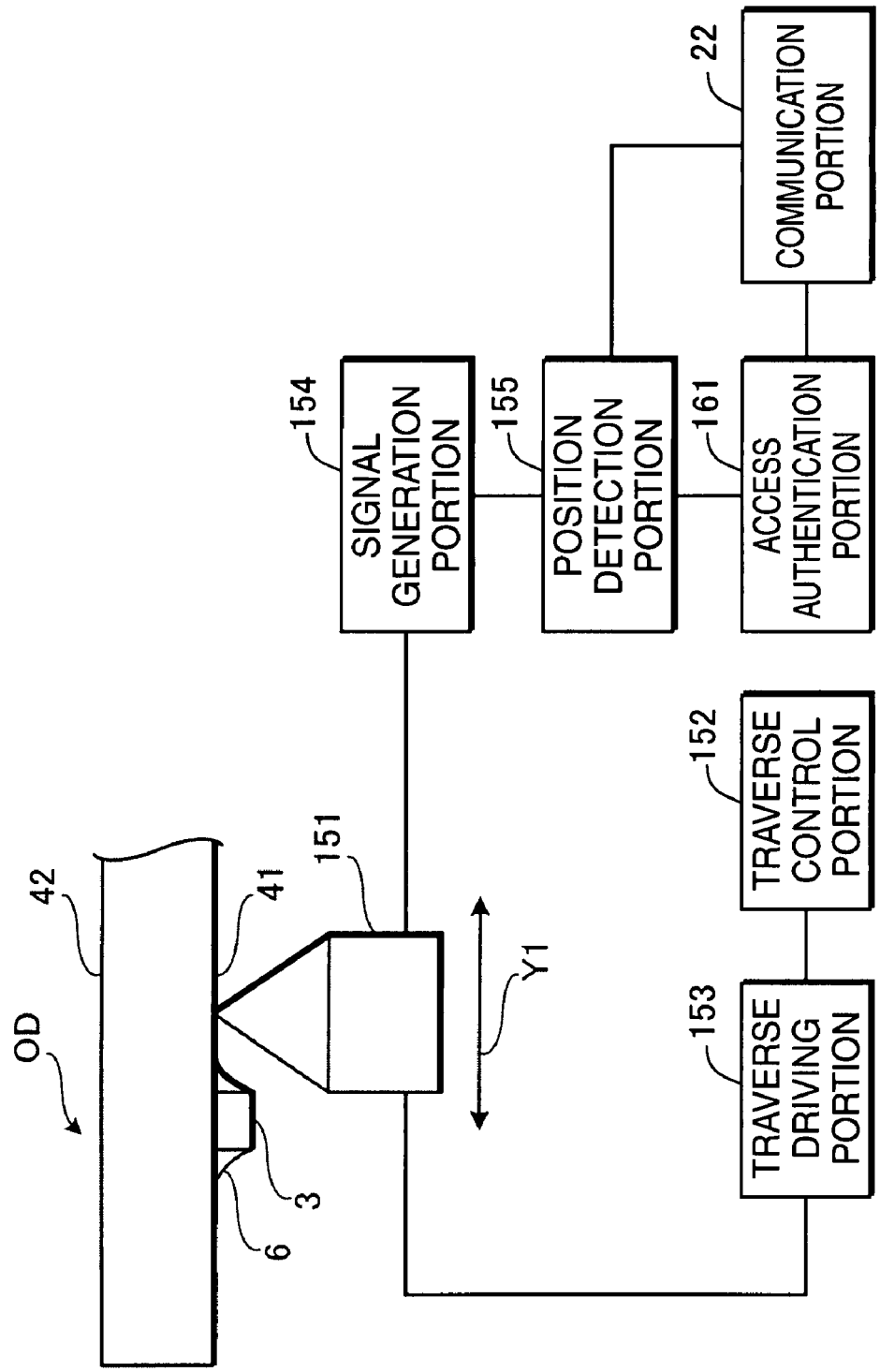
FIG. 12 is a view showing the internal configuration of an information recording/playback device of the third embodiment relating to position detection and access authentication.

The internal configurations of the information recording/playback device 2 and the RFID tag 3 of the third embodiment will now be described. FIG. 12 is a view showing the internal configuration of the information recording/playback device 2 of the third embodiment relating to position detection and access authentication. Because the internal configuration of the RFID tag 3 is the same as that of the RFID tag 3 shown in FIG. 3, descriptions will be given using FIG. 3.

The information recording/playback device 2 includes an optical head 151, a traverse control portion 152, a traverse driving portion 153, a signal generation portion 154, a position detection portion 155, an access authentication portion 161, and a communication portion 22. The traverse control portion 152, the position detection portion 155, and the access authentication portion 161 are provided to the control portion 20 shown in FIG. 2. The optical head 151, the traverse driving portion 153, and the signal generation portion 154 are provided to the removable recording medium recording portion 15 shown in FIG. 2. The other configurations of the information recording/playback device 2 shown in FIG. 12 are the same as the configurations of the information recording/playback device 2 shown in FIG. 2.

The position detection portion 155 detects the position of the RFID tag 3 laminated to the optical disk OD in the optical recording information region (a shaded portion shown in FIG. 16) on the recording surface 41. The position detection portion 155 then outputs the position information of the RFID tag 3 thus detected to the communication portion 22. The communication portion 22 transmits the position information to the RFID tag 3.

The communication portion 22 also receives the position information transmitted from the RFID tag 3 and outputs this information to the access authentication portion 161. The position detection portion 155 detects the position of the RFID tag 3 within the optical disk OD, and outputs the detected position information to the access authentication portion 161. The access authentication portion 161 then judges whether the detected position coincides with the position information received at the communication portion 22. Upon judging that the detected position coincides with the position information received at the communication portion, the access authentication portion 161 permits access to the optical disk OD.

Figure 13:
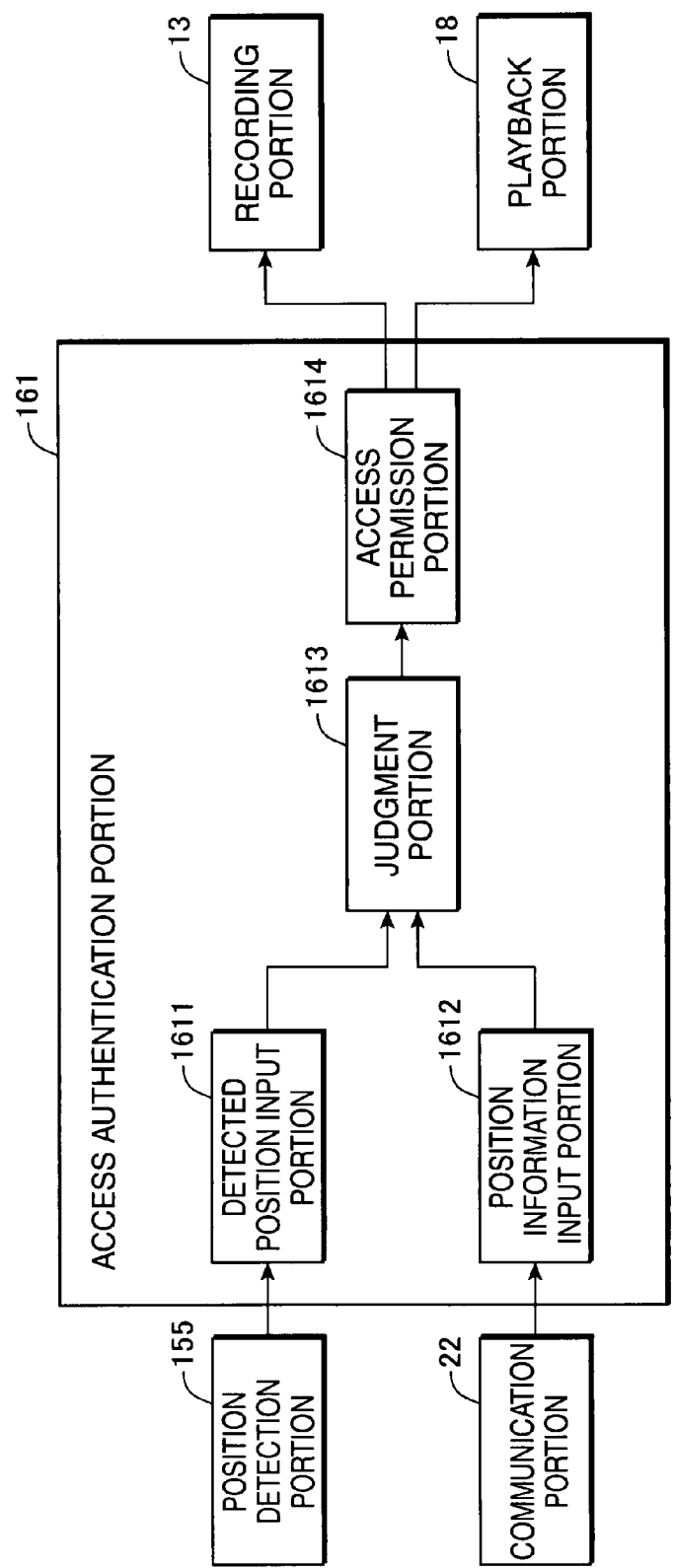
FIG. 13 is a block diagram showing the concrete configuration of an access authentication portion.

A concrete configuration of the access authentication portion 161 will now be described. FIG. 13 is a block diagram showing the concrete configuration of the access authentication portion 161. The access authentication portion 161 shown in FIG. 13 includes a detected position input portion 1611, a position information input portion 1612, a judgment portion 1613, and an access permission portion 1614.

The detected position of the RFID tag 3 detected by the position detection portion 155 is inputted into the detected position input portion 1611. The position information received at the communication portion 22 is inputted into the position information input portion 1612. The judgment portion 1613 judges whether the detected position inputted into the detected position input portion 1611 coincides with the position information inputted into the position information input portion 1612.

The access permission portion 1614 permits access to the optical disk OD when the judgment portion 1613 judges that the detected position coincides with the position information.

When the access permission portion 1614 permits access, it outputs an access permission signal to the playback portion 18 or to the recording portion 13. Upon input of the access permission signal, the playback portion 18 starts to play back the information from the optical disk OD. Also, upon input of the access permission signal, the recording portion 13 starts to record information into the optical disk OD.

The communication portion 304 of the RFID tag 3 receives the position information transmitted from the information recording/playback device 2 and outputs this information to the control portion 301. The control portion 301 stores the received position information in the RWM 303. The control portion 301 also reads out the position information stored in the RWM 303 and outputs this information to the communication portion 304. The communication portion 304 then transmits the position information to the information recording/playback device 2.

In this embodiment, the optical disk OD corresponds to one example of the recording medium, the RFID tag 3 corresponds to one example of the information storage device, the control portion 20 corresponds to one example of the position detection means, the control portion 20 and the communication portion 22 correspond to one example of the position information writing means, the information recording/playback device 2 corresponds to one example of the position detection device, the position detection portion 155 corresponds to one example of the address detection means, the information recording/playback device 2 corresponds to one example of the access authentication device, the control portion 20 and the communication portion 22 correspond to one example of the position information read means, the control portion 20 and the communication portion 22 correspond to one example of the position information acquisition means, and the RWM 303 corresponds to one example of the position information storage means.

Also, the position detection portion 155 corresponds to one example of the position detection control device, the access authentication portion 161 corresponds to one example of the access authentication control device, the detected position input portion 1611 corresponds to one example of the detected position input means, the position information input portion 1612 corresponds to one example of the position information input means, the judgment portion 1613 corresponds to one example of the judgment means, and the access permission portion 1614 corresponds to one example of the access permission means.

Position detection processing of the RFID tag 3 in the third embodiment will now be described. As is shown in FIG. 12, a laser beam from the optical head 151 is irradiated to the optical disk OD on the side of the recording surface 41. The optical head 151 records information into the optical disk OD and plays back the information from the optical disk OD. The entire optical head 151 is moved in a direction (indicated by an arrow Y1) perpendicular to a direction of tracks of the optical disk OD by the traverse driving portion 153. The traverse driving portion 153 causes the optical head 151 to move according to a control signal outputted from the traverse control portion 152. Although it is omitted from the drawing, the optical head 151 comprises a light source, such as a semiconductor laser, a coupling lens, a polarization beam splitter, a polarization plate, a convergence lens, a light-collection lens, a dividing mirror, a photo-detector, etc.

The optical information recorded in the optical disk OD is managed by addresses. It is thus possible to specify the position on the optical disk OD at which the RFID tag 3 is laminated thereon by playing the optical disk OD to detect a region from which no data is read out from the optical disk OD. The signal generation portion 154 generates a playback signal according to reflected light, which is light emitted from the light source of the optical head 151 and reflected on the optical disk OD. The position detection portion 155 detects the address of a region from which no data is read out from the optical disk OD as the position information of the RFID tag 3.

Figure 14:
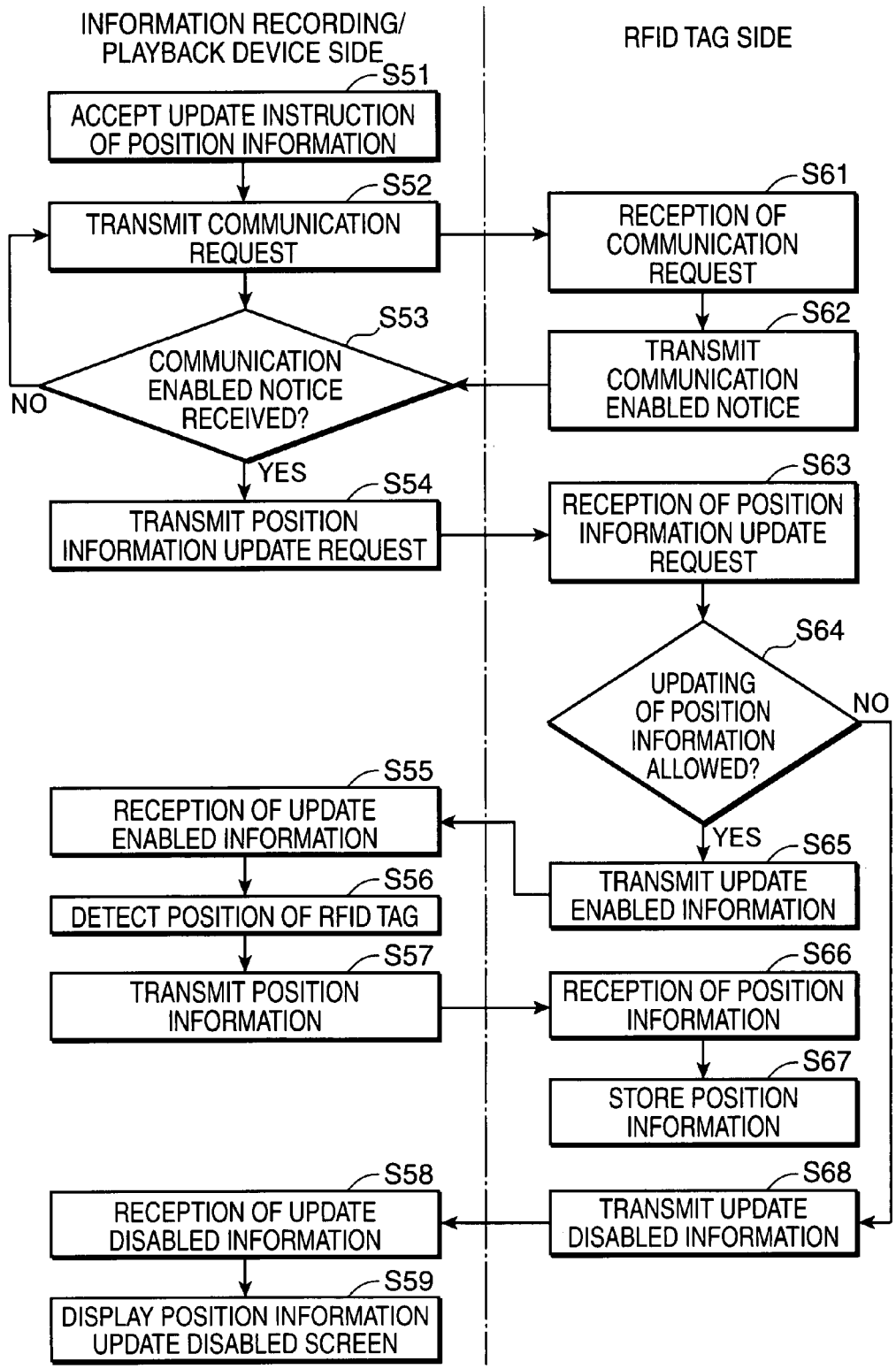
FIG. 14 is a flowchart used to describe processing to store position information in the RFID tag.

FIG. 14 is a flowchart used to describe processing to store the position information in the RFID tag.

Initially, when the user inputs a position information update instruction for the RFID tag 3 using specific input keys in the manipulation portion 21 of the information recording/playback device 2, the control portion 20 of the information recording/playback device 2 accepts the position information update instruction from the user via the manipulation portion 21 in Step S51.

Because processing in Steps S52, S53, S61, and S62 is the same as the processing in Steps S2, S3, S11, and S12, respectively, shown in FIG. 5, descriptions of these steps are omitted.

Subsequently, in Step S54, the control portion 20 instructs the communication portion 22 to transmit a position information update request, and the communication portion 22 transmits the position information update request to the RFID tag 3.

Subsequently, in Step S63, the communication portion 304 of the RFID tag 3 receives the position information update request, and outputs this request to the control portion 301.

Subsequently, in Step S64, the control portion 301 judges whether the position information can be updated. In this embodiment, re-writing of the position information is inhibited. That is to say, once the position information is stored, this position information cannot be re-written. The control portion 301 therefore judges that the position information can be updated in a case where the position information has not been stored in the RWM 303, and judges that the position information cannot be updated in a case where the position information has been stored in the RWM 303.

Upon judging that the position information cannot be updated (NO in Step S64), in Step S68, the control portion 301 instructs the communication portion 304 to transmit update disabled information informing that the position information cannot be updated, and the communication portion 304 transmits the update disabled information to the information recording/playback device 2.

Subsequently, in Step S58, the communication portion 22 of the information recording/playback device 2 receives the update disabled information and outputs this information to the control portion 20. Subsequently, in Step S59, the control portion 20 controls the monitor 5 to display thereon a position information update disabled screen notifying that the position information stored in the RFID tag 3 cannot be updated.

On the contrary, upon judging that the position information can be updated (YES in Step S64), in Step S65, the control portion 301 instructs the communication portion 304 to transmit update enabled information informing that the position information can be updated, and the communication portion 304 transmits the update enabled information to the information recording/playback device 2.

Subsequently, in Step S55, the communication portion 22 of the information recording/playback device 2 receives the update enabled information and outputs this information to the control portion 20. In Step S56, the control portion 20 detects the position on the optical disk at which the RFID tag 3 is laminated thereon. Data present correspondingly to the position at which the RFID tag 3 is laminated onto the optical disk cannot be read out. It is thus possible to detect the position at which the RFID tag 3 is laminated onto the optical disk by detecting the address of a region from which data cannot be read out. The control portion 20 plays the optical disk and detects the address of data that cannot be played back as the position information of the RFID tag 3.

The RFID tag 3 is preferably of a size that is long in the radius direction and long enough in the track direction not to cause an ECC error, for example, 1 to 2 mm. The reflectance on the surface of the RFID tag 3 is preferably the reflectance at which a BDO signal can be detected.

Subsequently, in Step S57, the control portion 20 instructs the communication portion 22 to transmit the position information, and the communication portion 22 transmits the position information to the RFID tag 3.

Subsequently, in Step S66, the communication portion 304 of the RFID tag 3 receives the position information and outputs this information to the control portion 301. The control portion 301 stores the position information received at the communication portion 304 into the RWM 303.

As has been described, the position on the optical disk OD of the RFID tag 3 provided to the optical disk OD is detected, and the detected position on the optical disk OD of the RFID tag 3 is written into the RFID tag 3 as the position information.

Because the position on the optical OD of the RFID tag 3 provided to the optical disk OD is detected and the detected position on the optical disk OD of the RFID tag 3 is written into the RFID tag 3 as the position information, by using this position information in access authentication for the optical disk OD, it is possible to prevent illegal copying of the information recorded in the optical disk OD. For example, even when the RFID tag 3 provided to the optical disk OD is removed and laminated to another optical disk having stored a copy of the information recorded in the optical disk OD, access to the optical disk fails unless the laminated position coincides with the position information stored in the RFID tag 3. It is thus possible to prevent illegal copying of the information recorded in the optical disk OD.

Also, optical recording information is recorded into and/or played back from the optical disk OD with the use of a laser beam emitted from the optical head 151, and the RFID tag 3 is laminated to the optical disk OD on the recording surface 41 on which a laser beam goes incident. It is thus possible to detect an address at which playback fails by playing the optical disk OD.

Because the RFID tag 3 is laminated to the optical disk OD on the recording surface 41 on which a laser beam goes incident, when the optical disk OD is played, the position at which the RFID tag 3 is laminated onto the optical disk OD can be detected by detecting the address of a region in which playback fails.

Further, the position information detected by the position detection device (information recording/playback device 2) that detects the position on the optical disk OD of the RFID tag 3 laminated onto the optical disk OD is acquired from the information recording/playback device 2, and the position information thus acquired is stored.

Because the position on the optical disk OD of the RFID tag 3 provided to the optical disk OD is stored in the RFID tag 3 as the position information, by using this position information in access authentication for the optical disk OD, it is possible to prevent illegal copying of the information recorded in the optical disk OD. For example, even when the RFID tag 3 provided to the optical disk OD is removed and laminated to another optical disk having stored a copy of the information recorded in the optical disk OD, access to the optical disk fails unless the laminated position coincides with the position information stored in the RFID tag 3. It is thus possible to prevent illegal copying of the information recorded in the optical disk OD.

Figure 15:
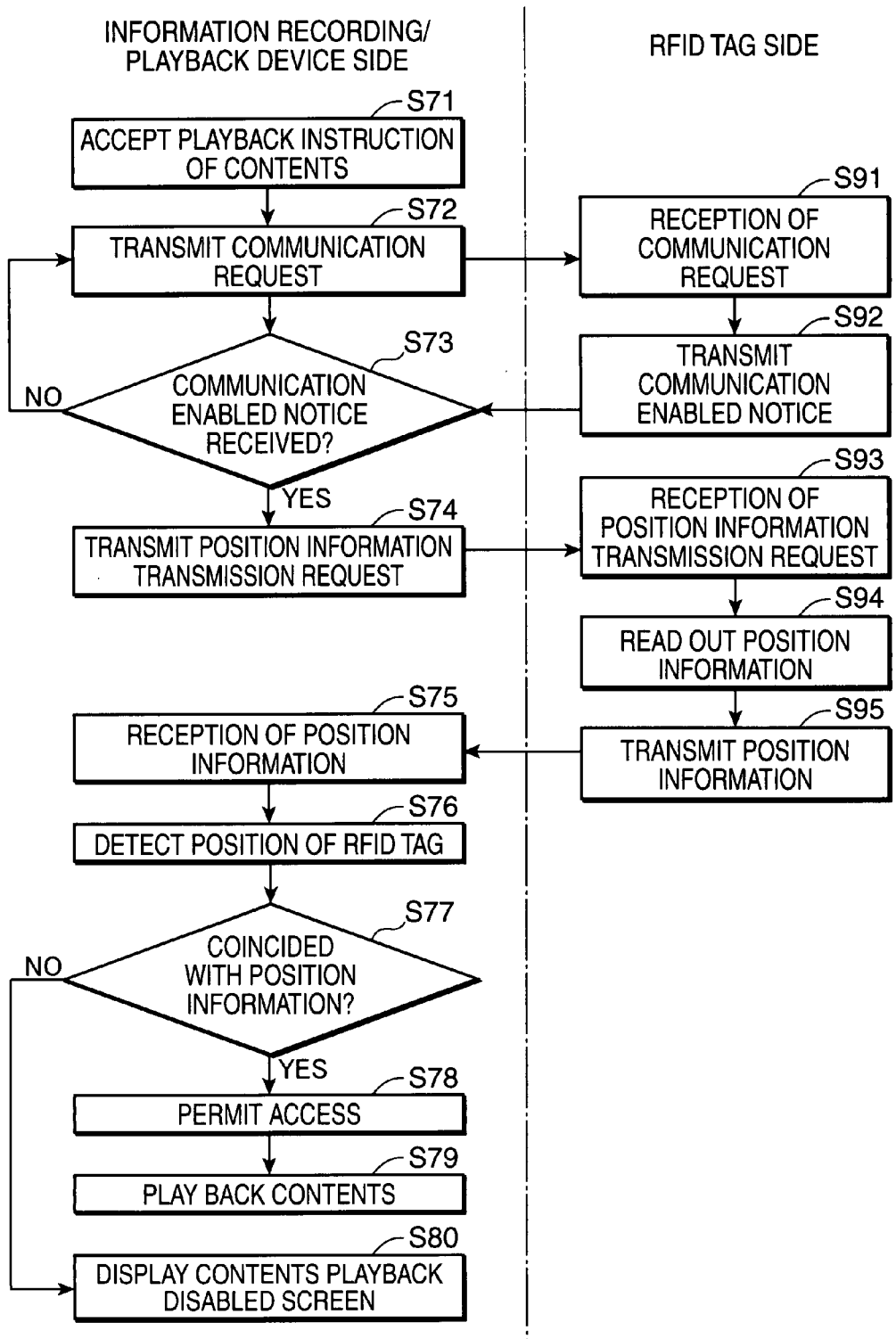
FIG. 15 is a flowchart used to describe processing to authenticate access to an optical disk provided with the RFID tag.

Processing to authenticate access to the optical disk provided with the RFID tag 3 will now be described. FIG. 15 is a flowchart used to describe the processing to authenticate access to the optical disk provided with the RFID tag 3. In the description below, assume that the position information has been already stored in the RFID tag 3.

Because processing in Steps S71 through S73, S91, and S92 is the same as the processing in Steps S1 through S3, S11 and S12, respectively, shown in FIG. 5, descriptions of these steps are omitted.

Subsequently, in Step S74, the control portion 20 of the information recording/playback device 2 instructs the communication portion 22 to transmit a position information transmission request to request transmission of the position information, and the communication portion 22 transmits the position information transmission request to the RFID tag 3.

Subsequently, in Step S93, the communication portion 304 of the RFID tag 3 receives the position information transmission request and outputs this request to the control portion 301. Subsequently, in Step S94, the control portion 301 reads out the position information stored in the RWM 303. Subsequently, in Step S95, the control portion 301 outputs the position information thus read out to the communication portion 304, and the communication portion 304 transmits the position information to the information recording/playback device 2.

Subsequently, in Step S75, the communication portion 22 of the information recording/playback device 2 receives the position information and outputs this information to the control portion 20. Subsequently, in Step S76, the control portion 20 detects the position on the optical disk at which the RFID tag 3 is laminated thereon. Because detection of the position at which the RFID tag 3 is laminated onto the optical disk is the same as the processing in Step S56 of FIG. 14, descriptions of this step are omitted.

Subsequently, in Step S77, the control portion 20 judges whether the detected position of the RFID tag 3 coincides with the position information received from the RFID tag 3. Upon judging that the detected position of the RFID tag 3 does not coincide with the position information received from the RFID tag 3 (NO in Step S77), in Step S80, the control portion 20 controls the monitor 5 to display thereon a contents playback disabled screen notifying that the contents recorded in the optical disk OD cannot be played back. In other words, in a case where the detected position of the RFID tag 3 does not coincide with the position information received from the RFID tag 3, there is a possibility that the RFID tag 3 is stripped off and laminated to another optical into which the optical recording information has been copied illegally. In this embodiment, it is possible to prevent illegal copying of the contents by inhibiting the contents from being played back when the detected position of the RFID tag 3 does not coincide with the position information received from the RFID tag 3.

On the contrary, upon judging that the detected position of the RFID tag 3 coincides with the position information received from the RFID tag 3 (YES in Step S77), in Step S78, the control portion 20 permits access to the optical disk OD. Subsequently, in Step S79, the control portion 20 controls the recording and playback interface portion 14 and the playback portion 18 to play back the contents recorded in the optical disk OD.

As has been described, the RFID tag 3 has stored the position information specifying the position on the optical disk OD at which the RFID tag 3 is disposed, and the position on the optical disk OD at which the RFID tag 3 is disposed is detected while the position information is read out from the RFID tag 3. Whether the detected position coincides with the position information that has been read out is judged, and in a case where it is judged that the detected position coincides with the position information that has been read out, access to the optical OD is permitted.

Because access to the optical disk OD is not permitted in a case where it is judged that the detected position does not coincide with the position information that has been readout, for example, even when the RFID tag 3 provided to the optical disk OD is removed and laminated to another optical disk having stored a copy of the information recorded in the optical disk OD, access to the optical disk fails unless the laminated position coincides with the position information. It is thus possible to prevent illegal copying of the information recorded in the optical disk OD.

This embodiment has described a case where the contents are played back from the optical disk OD as an example of making access to the optical disk OD. The invention, however, is not particularly limited to this case, and the invention is applicable to a case where information, such as contents, is recorded into the optical disk OD, a case where information, such as contents, is copied in the optical disk OD, or a case where information, such as contents, is moved to the optical disk OD.

Also, in this embodiment, the RFID tag 3 is laminated to the optical disk OD on the recording surface 41. The invention, however, is not particularly limited to this case, and the RFID tag 3 may be laminated to the optical disk OD on the label surface opposing the recording surface 41. The position detection processing in this case will be described in the following.

Figure 16:
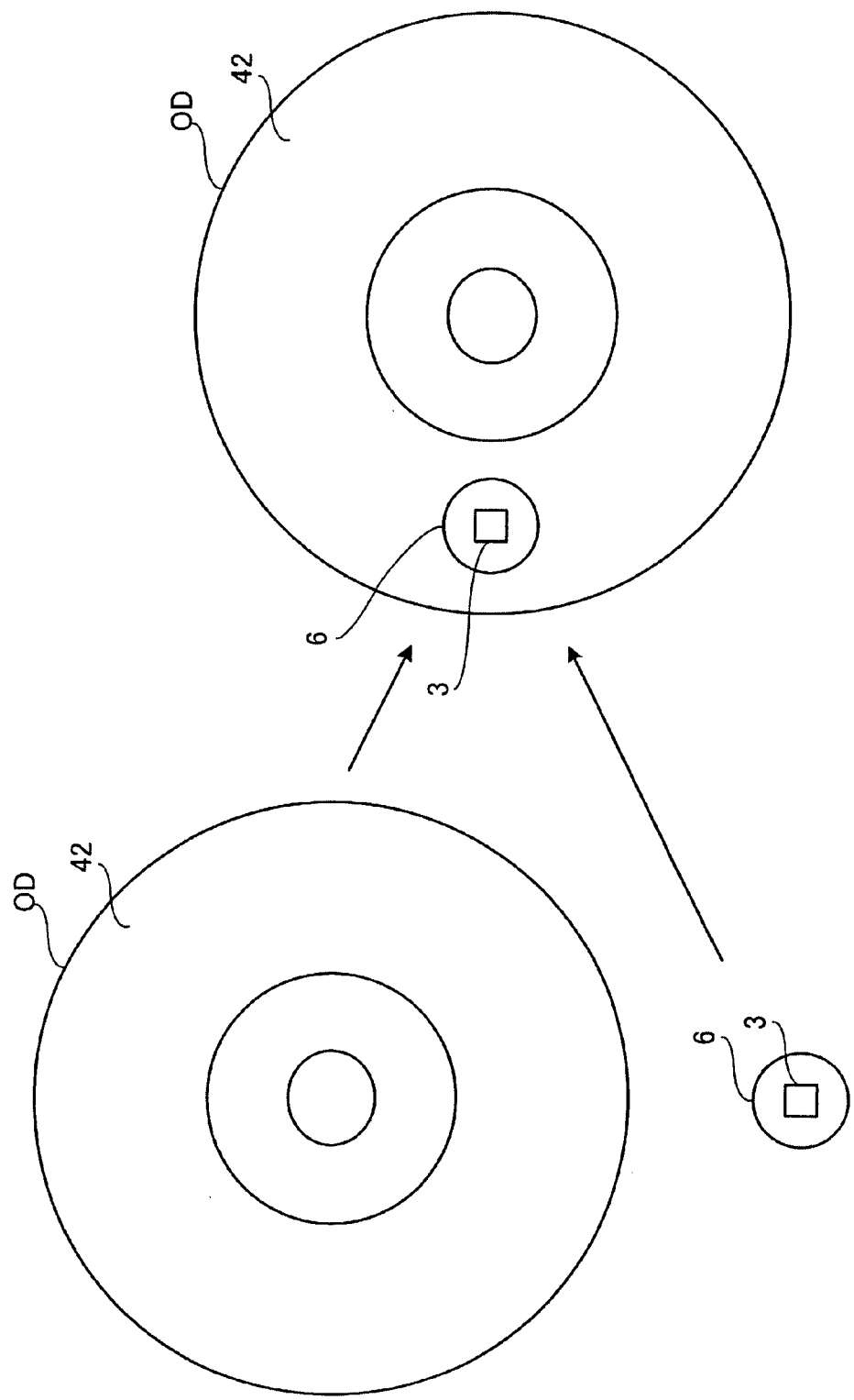
FIG. 16 is a view used to describe an optical disk according to a first modification of the third embodiment.

FIG. 16 is a view used to describe an optical disk according to a first modification of the third embodiment. As is shown in FIG. 16, the RFID tag 3 is laminated to the optical disk OD on the label surface 42 on the opposite side to the recording surface with the adhesive seal 6. The user laminates the RFID tag 3 to the optical disk OD at an arbitrary position on the side of the label surface 42.

Position detection processing of the RFID tag 3 according to the first modification of the third embodiment will now be described. FIG. 17 is a view used to describe the position detection processing of the RFID tag 3 according to the first modification of the third embodiment. FIG. 17A is a view used to describe the position detection processing in a case where a laser beam is irradiated onto the label surface of the optical disk OD. FIG. 17B is a view used to describe the position detection processing in a case where a laser beam is irradiated onto the recording surface of the optical disk OD.

Initially, the user inserts the optical disk OD with the label surface 42 face down, so that a laser beam from the optical head 151 is irradiated onto the label surface 42. As is shown in FIG. 17A, a laser beam from the optical head 151 is irradiated to the optical disk OD on the side of the label surface 42. The entire optical head 151 is moved in a direction (indicated by an arrow Y1) perpendicular to a direction of the tracks of the optical disk OD by the traverse driving portion 153. The traverse driving portion 153 causes the optical head 151 to move according to a control signal outputted from the traverse control portion 152. Although it is omitted from the drawing, the optical head 151 comprises a light source, such as a semiconductor laser, a coupling lens, a polarization beam splitter, a polarization plate, a convergence lens, a light-collection lens, a dividing mirror, a photo-detector, etc.

The signal generation portion 154 generates not only a playback signal according to reflected light, which is light emitted from the light source of the optical head 151 and reflected on the optical disk OD, but also a focus error signal according to branched light branched from the emitted light. The signal generation portion 154 outputs the generated focus error signal to the focus control portion 156. The focus control portion 156 controls the focus driving portion 157 according to the focus error signal to compensate for a focus error. The focus driving portion 157 adjusts the focus position by moving the light-collection lens or the like of the optical head 151 in the direction of the optical axis.

In a case where a laser beam is irradiated onto the label surface 42 of the optical disk OD, the focus position is always at a constant position. In a portion on which the RFID tag 3 is laminated, however, the focus position is shifted by a quantity comparable to the thickness of the RFID tag 3. Such being the case, when a laser beam is irradiated to the portion on which the RFID tag 3 is laminated, the signal generation portion 154 generates a focus error signal. Upon input of the focus error signal, the focus control portion 156 outputs the focus error signal to the traverse control portion 152. The traverse control portion 152 stores the traverse position at the instant of input of the focus signal into the traverse position storage portion 158.

The user then inserts the optical disk OD with the recording surface 41 face down, so that a laser beam from the optical head 151 is irradiated to the recording surface 41. As is shown in FIG. 17B, a laser beam from the optical head 151 is irradiated to the optical disk OD on the side of the recording surface 41. The traverse control portion 152 controls the traverse driving portion 153 to move the optical head 151 to the traverse position stored in the traverse position storage device 158. When the optical head 151 has been moved to the traverse position stored in the traverse position storage portion 158, the signal generation portion 154 generates the playback signal according to the reflected light, which is light emitted from the light source of the optical head 151 and reflected on the optical disk OD. According to the playback signal, the position detection portion 155 detects the track position corresponding to the traverse position as the position information of the RFID tag 3.

In this case, because the optical head 151 is allowed to move in the radius direction of the optical disk OD alone, it is only possible to detect the track position on the optical disk OD as the position information, and only the one-dimensional position of the RFID tag 3 can be detected. It is, however, possible to detect the 2-D position of the RFID tag 3 in the presence of a reference mark on the same track.

In this embodiment, the signal generation portion 154 corresponds to one example of the focus error signal detection means, the traverse position storage portion 158 corresponds to one example of the traverse position storage means, and the position detection portion 155 corresponds to one example of the track position detection means.

As has been described, optical recording information is recorded into and/or played back from the optical disk OD with the use of a laser beam emitted from the optical head 151, and the RFID tag 3 is laminated to the optical disk OD on the label surface 42 opposing the recording surface on which a laser beam goes incident. A laser beam is then irradiated from the label surface 42 to find a focus error signal, and a position at which the detected focus error signal is different from at the other positions is stored as the traverse position. Thereafter, a laser beam is irradiated from the recording surface 41, and the optical head 151 is moved to the stored traverse position to detect the track position at the traverse position.

Hence, in a case where a laser beam is irradiated to the label surface 42 on which the RFID tag 3 is laminated, the focus position is shifted by a quantity comparable to the RFID tag 3, and the focus error signal is detected. The position at which the RFID tag 3 is laminated onto the optical disk OD can be therefore detected by storing the traverse position at which the focus error signal was detected, and by irradiating a laser beam to the recording surface 41 and moving the optical head 151 to the stored traverse position to detect the track position on the optical disk OD.

According to the first modification of the third embodiment, after the traverse position of the optical head 151 is stored by irradiating a laser beam on the label surface 42, the optical disk OD is taken out and the position information of the RFID tag 3 is detected by irradiating a laser beam onto the recording surface 41. The invention, however, is not particularly limited to this case.

Figure 18:
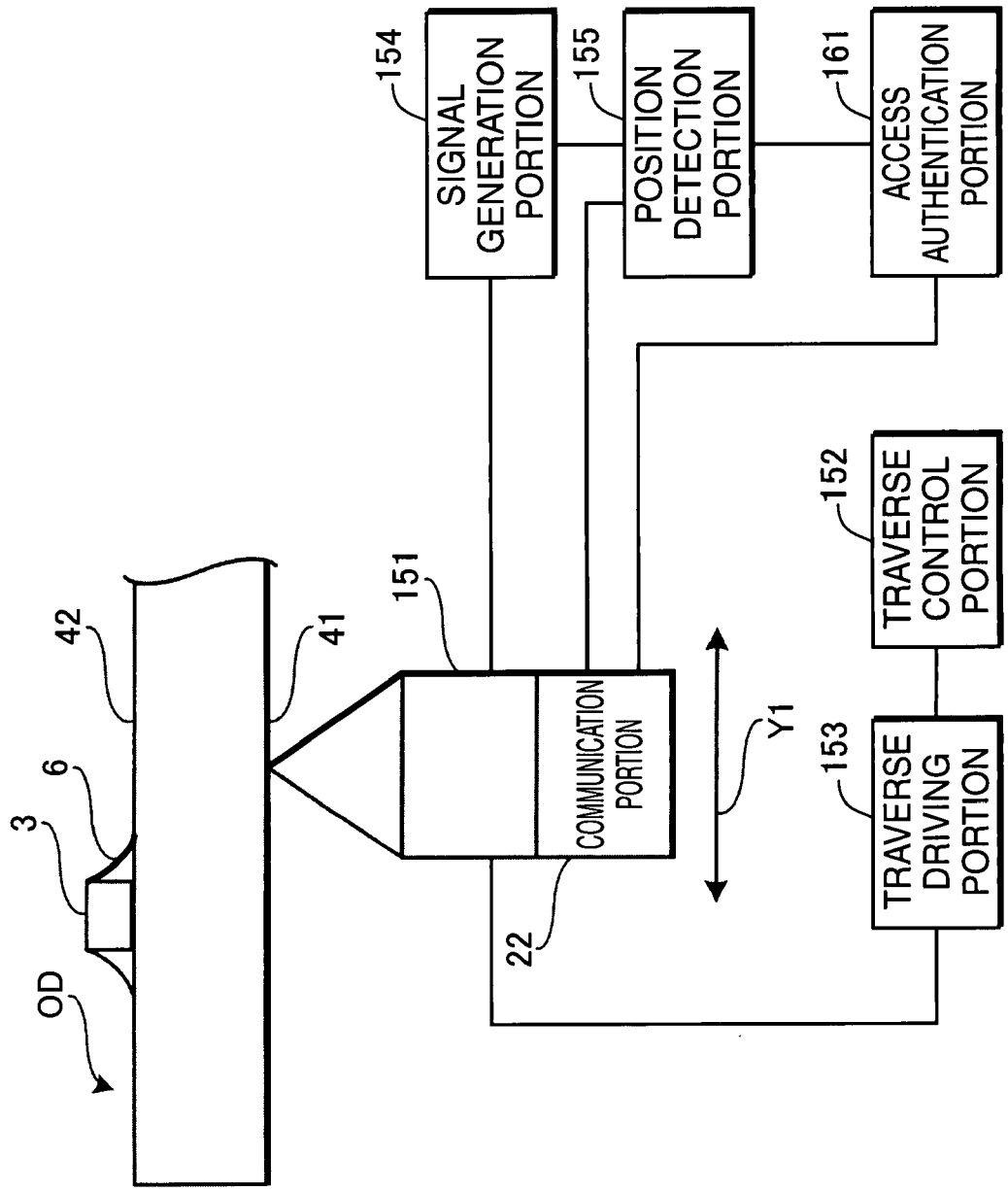
FIG. 18 is a view used to describe the position detection processing of the RFID tag according to a second modification of the third embodiment.

FIG. 18 is a view used to describe position detection processing of the RFID tag 3 according to a second modification of the third embodiment. As is shown in FIG. 18, the communication portion 22 is provided to the optical head 151 of the information recording/playback device 2. The communication portion 22 moves with the optical head 151 as one unit. The communication portion 304 of the RFID tag 3 outputs specific radio waves. The communication portion 22 receives the radio waves outputted from the communication portion 304 of the RFID tag 3, and outputs these radio waves to the position detection portion 155. The position detection portion 155 measures the strength of the received radio waves. The traverse control portion 152 controls the traverse driving portion 153 to move the optical head 151 in a direction (indicated by an arrow Y1) perpendicular to a direction of the tracks of the optical disk OD.

In the second modification of the third embodiment, the strength of radio waves outputted from the RFID tag 3 is measured by moving the optical head 151 while reading out the playback signal. The position detection portion 155 detects the address on the optical disk OD at which the strength of the radio waves reaches the maximum as the position information of the RFID tag 3.

In this embodiment, the communication portion 22 corresponds to one example of the reception means, and the position detection portion 155 corresponds to one example of the address detection means.

As has been described, the optical recording information is recorded into and/or played back from the optical disk OD with the use of a laser beam emitted from the optical head 151. Also, the RFID tag 3 is laminated to the optical disk OD on the label surface 42 opposing the recording surface 41 on which a laser beam goes incident. Further, specific radio waves are transmitted from the RFID tag 3, and the radio waves transmitted from the RFID tag 3 are received at the communication portion 22 provided to the optical head 151. The optical head 151 is then moved to detect the address of the position at which the strength of the radio waves received at the communication portion 22 reaches the maximum.

It is thus possible to detect the position at which the RFID tag 3 is laminated onto the optical disk OD by receiving radio waves transmitted from the RFID tag 3 while moving the optical head 151 to detect the address of the optical disk OD at the position at which the strength of the radio waves reaches the maximum.

A third modification of the third embodiment will now be described. According to the third modification of the third embodiment, a photo-diode is provided to the RFID tag 3, and radio waves are outputted in a case where light from the optical head is detected by the photo-diode. The information recording/playback device 2 then detects the address on the optical disk OD at the instant of reception of the radio waves outputted from the RFID tag 3 as the position information.

Figure 19:
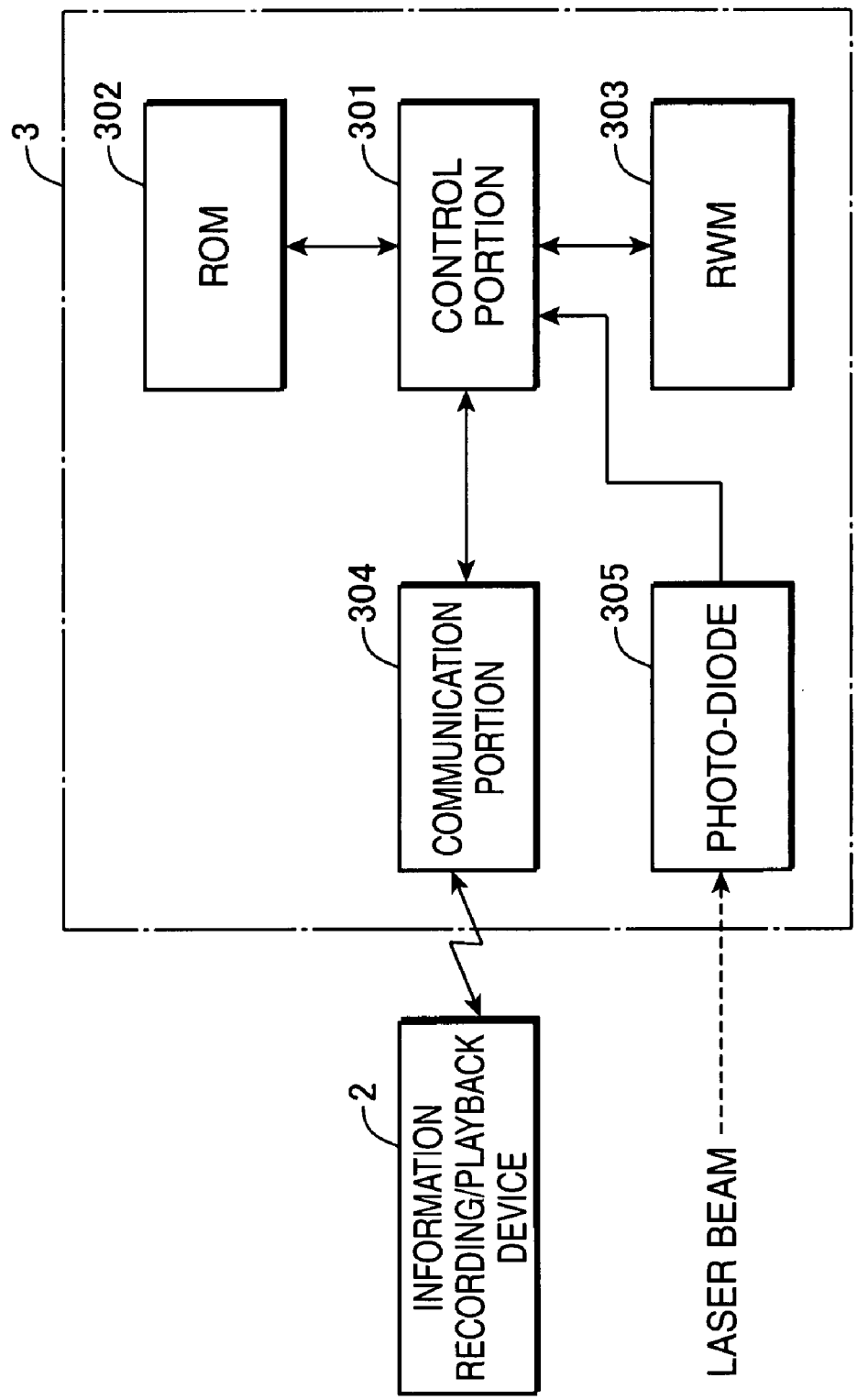
FIG. 19 is a view showing the configuration of an RFID tag according to a third modification of the third embodiment.

FIG. 19 is a view showing the configuration of the RFID tag 3 according to the third modification of the third embodiment. As is shown in FIG. 19, the RFID tag 3 further includes a photo-diode 305. A laser beam that goes incident on the recording surface 41 passes through the inside of the optical disk OD, and reaches the label surface 42. The photo diode 305 is provided to come in contact with the label surface 42 of the optical disk OD, and receives transmitted light, which is a laser beam irradiated to the recording surface 41 and having passed through the optical disk OD. The photo-diode 305 is a photo-electric conversion semiconductor device that generates a light current in response to the illuminance. Upon detection of a laser beam, the photo-diode 305 outputs an electric signal (current) to the control portion 301. Upon input of the electric signal from the photo-diode 305, the control portion 301 instructs the communication portion 304 to transmit a light detection notice notifying the detection of a laser beam, and the communication portion 304 transmits the light detection notice to the information recording/playback device 2.

Figure 20:
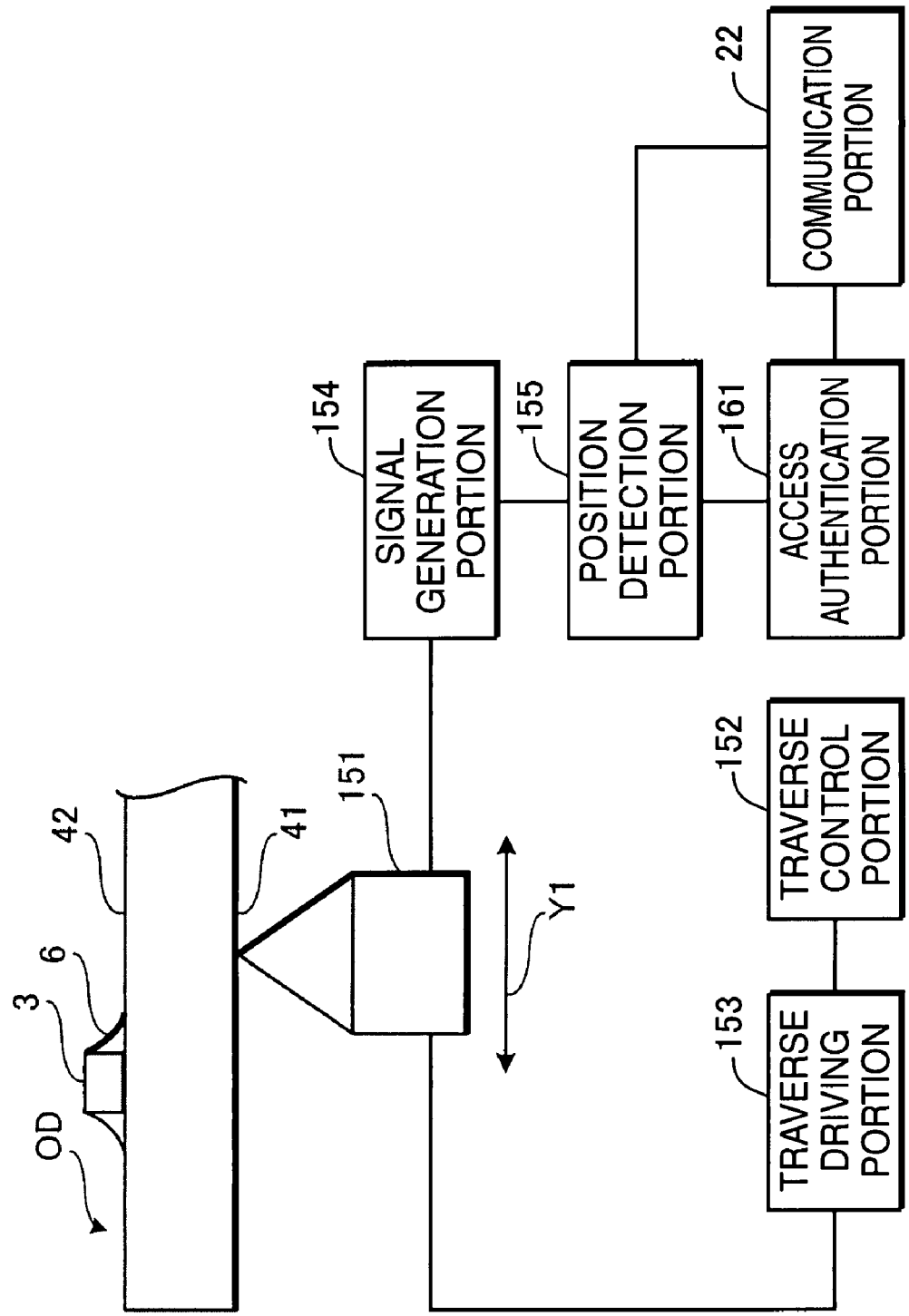
FIG. 20 is a view used to describe the position detection processing of the RFID tag according to the third modification of the third embodiment.

FIG. 20 is a view used to describe the position detection processing of the RFID tag according to the third modification of the third embodiment. As is shown in FIG. 20, the traverse control portion 152 controls the traverse driving portion 153 to cause the optical head 151 to move in a direction (indicated by an arrow Y1) perpendicular to a direction of tracks of the optical disk OD. In this instance, the signal generation portion 154 generates the playback signal and outputs the playback signal to the position detection portion 155. The communication portion 22 receives the light detection notice transmitted from the RFID tag 3 and outputs this notice to the position detection portion 155. The position detection portion 155 detects the address on the optical disk OD at the instant of input of the optical detection notice as the position information.

In this embodiment, the communication portion 22 corresponds to one example of the reception means, and the position detection portion 155 corresponds to one example of the address detection means.

The RFID tag 3 of this embodiment is configured to output radio waves when a laser beam emitted from the optical head 151 is detected by the photo-diode 305. The invention, however, is not particularly limited to this configuration. A heat detection element that detects heat generated from irradiation of a laser beam onto the optical disk OD may be provided to the RFID tag 3, so that radio waves are outputted when the heat detection element detects heat.

As has been described, optical recording information is recorded into and/or played back from the optical disk OD with the use of a laser beam emitted from the optical head 151. Also, the RFID tag 3 is laminated to the optical disk OD on the label surface 42 opposing the recording surface 41 on which a laser beam goes incident. Further, radio waves are transmitted from the RFID tag 3 upon reception of a laser beam, and the radio waves transmitted from the RFID tag 3 are received at the communication portion 22. The optical head 151 is then moved to detect the address at the instant of reception of the radio waves at the communication portion 22.

Because the RFID tag 3 transmits radio waves upon reception of a laser beam, by detecting the address on the optical disk OD at the instant of reception of the radio waves transmitted from the RFID tag 3 while moving the optical head 151, it is possible to detect the position at which the RFID tag 3 is laminated onto the optical disk OD.

The third embodiment and the first through third modifications of the third embodiment described above are of the configuration that the RFID tag 3 is laminated to the optical disk OD either on the recording surface or the label surface. The invention, however, is not particularly limited to this configuration, and it may be configured in such a manner that the RFID tag 3 is embedded into the optical disk OD beforehand during the fabrication sequence.

Figure 21:
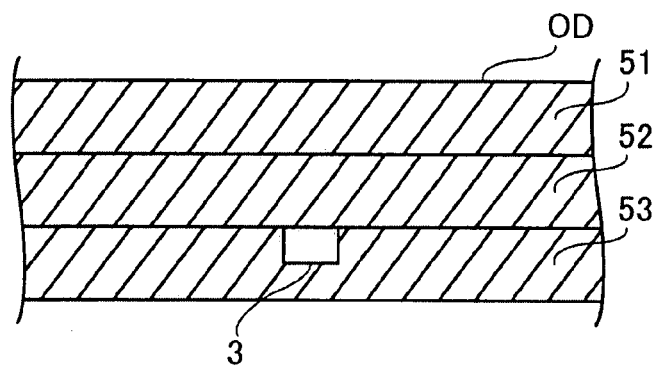
FIG. 21 is a cross section in the radius direction schematically showing the structure of an optical disk.

FIG. 21 is a cross section in the radius direction schematically showing the structure of the optical disk OD. As is shown in FIG. 21, in the optical disk OD, a recording layer 52 is laminated on a substrate 51, and a cover layer 53 is layered on the recording layer 52. Initially, the recording layer 52 is formed by applying an optical recording material of the phase-change type onto the substrate 51 made of, for example, polycarbonate, by means of sputtering or the like. The cover layer 53 is then formed by applying resin on the top surface of the recording layer 52 by means of spin coating or the like. In this instance, the RFID tag 3 is disposed on the top surface of the recording layer 52, after which the cover layer 53 is formed. In this manner, the RFID tag 3 is embedded in the optical disk OD.

An optical disk manufacturing device that manufactures an optical disk is of the configuration that enables the position detection processing described above, and therefore detects the position at which the RFID tag 3 is embedded in the optical disk OD by performing the position detection processing in the same manner as above. The detected position information is stored in the RFID tag 3.

As has been described, because the RFID tag 3 is embedded at the pre-set position, and the RFID tag 3 has previously stored the position information of the RFID tag 3 on the optical disk OD, by using this position information in the access authentication for the optical disk OD, it is possible to prevent illegal copying of the information recorded in the optical disk OD. For example, even when the information recorded in the optical disk OD, in which the RFID tag 3 is embedded, is copied into another optical disk and an attempt is made to access the copied optical disk, the access to the optical disk fails because the RFID tag 3 is not embedded therein. It is thus possible to prevent illegal copying of the information recorded in the optical disk OD.

The case of FIG. 21 shows an optical disk having a single recording layer. The invention, however, is not particularly limited to this case, and is applicable to an optical disk provided with more than one recording layer into/from which information can be recorded and played back.

Figure 22:
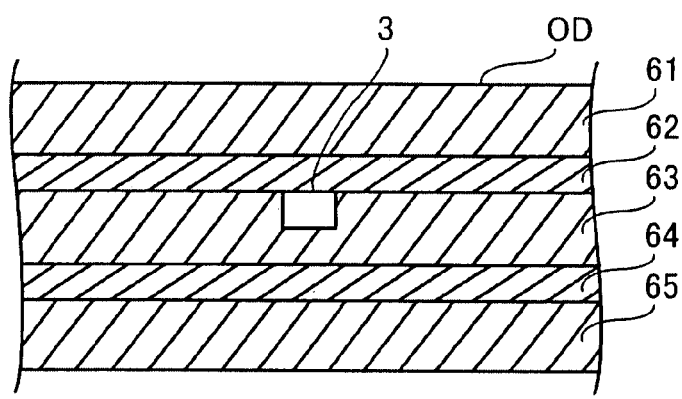
FIG. 22 is a cross section in the radius direction schematically showing another structure of the optical disk.

FIG. 22 is a cross section in the radius direction schematically showing another structure of the optical disk OD. As is shown in FIG. 22, in the optical disk OD, a first recording layer 62 is laminated on a substrate 61, an intermediate layer 63 is laminated on the first recording layer 62, a second recording layer 64 is laminated on the intermediate layer 63, and a cover layer 65 is laminated on the second recording layer 64. The first recording layer 62 is a recording layer into/from which information conforming to the standards of a CD can be recorded/played back. The second recording layer 64 is a recording layer into/from which information conforming to the standards of a DVD can be recorded/played back.

Initially, the first recording layer 62 is formed by applying an optical recording material of the phase-change type on the substrate 61 made of, for example, polycarbonate, by means of sputtering or the like. The intermediate layer 63 is then formed by applying resin on the top surface of the first recording layer 62 by means of spin coating or the like. In this instance, the RFID tag 3 is disposed on the top surface of the first recording layer 62, after which the intermediate layer 63 is formed. The second recording layer 64 is then formed by applying an optical recording material of the phase-change type on the intermediate layer 63 by means of sputtering or the like. Subsequently, the cover layer 65 is formed by applying resin on the top surface of the second recording layer 64 by means of spin coating or the like. In this manner, the RFID tag 3 is embedded in the optical disk OD.

An optical disk manufacturing device that manufactures an optical disk is of the configuration that enables the position detection processing described above, and therefore detects the position at which the RFID tag 3 is embedded in the optical disk OD by performing the position detection processing in the same manner as above. The detected position information is stored in the RFID tag 3. Herein, the address on the first recording layer 62 is detected as the position information. In a case where access is made to information recorded in the second recording layer 64, whether the position information stored in the RFID tag 3 coincides with the position information of the RFID tag 3 on the first recording layer 62 is judged. Access to the information recorded in the second recording layer 64 is permitted when the coincidence with the position information is judged.

In this embodiment, the optical disk OD includes plural recording layers corresponding to wavelengths of laser beams used to record and/or play back optical recording information. The invention, however, is not particularly limited to this configuration, and the optical disk OD may include plural recording layers onto which laser beams of the same wavelength are irradiated. For example, in a DVD or the like having plural recording layers, the RFID tag 3 is disposed on one recording layer among plural recording layers, and the position information stored in the RFID tag 3 is used in the access authentication for any other recording layer.

As has been described, because plural recording layers are included and the RFID tag 3 is disposed on one recording layer among plural recording layers, by using this position information in the access authentication for any other recording layer, it is possible to prevent illegal copying of the information recorded in the optical disk OD. For example, when the information recorded in the optical disk OD, in which the RFID tag 3 is embedded in one recording layer among plural recording layers, is copied into another optical disk and an attempt is made to access any other recording layer in the copied optical disk, access to any other recording layer in the copied optical disk fails because the RFID tag 3 is not embedded in one recording layer. It is thus possible to prevent illegal copying of the information recorded in the optical disk OD.

A concrete example using the position detection processing and the access authentication processing in the third embodiment will now be described. At a rental shop that checks out CD's and DVD's, an employee first laminates the RFID tag 3 at an arbitrary position on a DVD that a member wishes to check out.

The employee inserts the DVD onto which the RFID tag 3 has been laminated into a writing device used exclusively to detect the lamination position of the RFID tag 3 and to store the position information indicating where the RFID tag 3 is laminated onto the DVD into the RFID tag 3. The writing device is of the same configuration as the information recording/playback device 2 shown in FIG. 2 and FIG. 12 except that the configuration unnecessary for the position detection processing is omitted. That is to say, for example, the antenna 4, the tuner 11, the decoder 12, the recording portion 13, etc. are omitted from the configuration in FIG. 2.

The writing device detects the position at which the RFID tag 3 is laminated onto the DVD by the position detection processing described above, and stores this position into the RFID tag 3 as the position information. Further, the writing device stores return due date information indicating a return due date and private information of the member into the RFID tag 3. In this manner, the DVD provided with the RFID tag 3 having stored the position information, the return due date information, and the private information is checked out to the member.

The member inserts the DVD on which the RFID tag 3 is laminated into the information recording/playback device 2 at home. This information recording/playback device 2 is of the same configuration as the information recording/playback device 2 shown in FIG. 2 and FIG. 12.

The access authentication processing shown in FIG. 15 is then performed, and the contents recorded in the DVD are played back. In this instance, in a case where the coincidence with the position information is judged in Step S77, it is judged whether the due date has passed. In other words, in a case where it is judged that the due date has passed, the flow proceeds to the processing in Step S80 to display a message that contents cannot be played back. On the contrary, in a case where it is judged that the return due date has not passed, the flow proceeds to the processing in Step S78 to permit access to the DVD.

In this manner, the member is allowed to play back the contents only when the coincidence with the position information of the RFID tag 3 is judged and the return due date has not passed.

Figure 23:
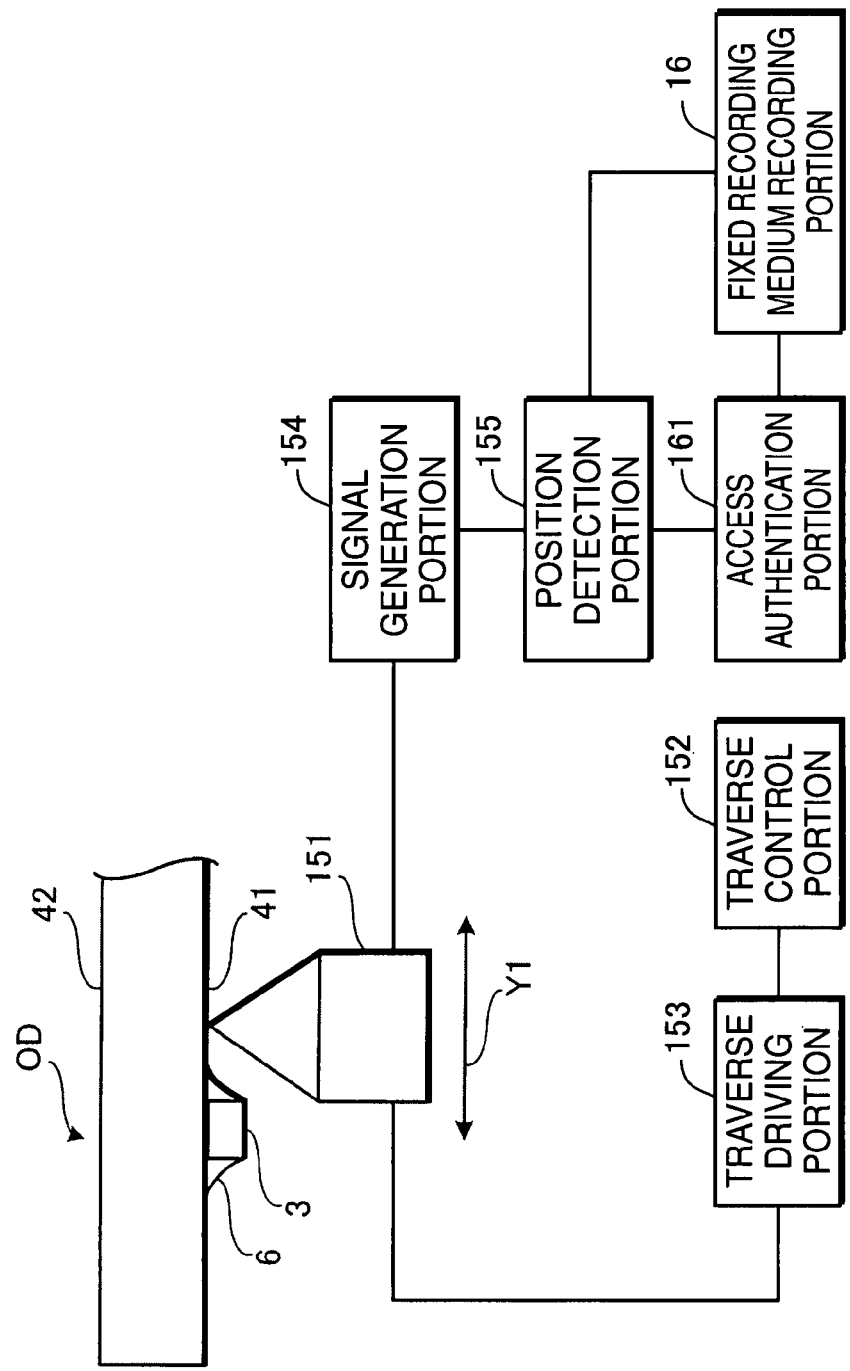
FIG. 23 is a view showing the internal configuration of an information recording/playback device relating to position detection and access authentication in a case where position information is recorded into a fixed recording medium.

The information recording/playback device 2 of this embodiment transmits the detected position information of the RFID tag 3 to the RFID tag 3 for the position information to be stored in the RFID tag 3. The invention, however, is not particularly limited to this configuration, and the detected position information of the RFID tag 3 may be recorded in a fixed recording medium provided to the information recording/playback device 2. FIG. 23 is a view showing the internal configuration of the information recording/playback device relating to the position detection and the access authentication in a case where the position information is recorded in a fixed recording medium.

As is shown in FIG. 23, in the position detection processing, the position detection portion 155 detects the position of the RFID tag 3 laminated onto the optical disk OD. The position detection portion 155 then outputs the detected position information of the RFID tag 3 to the fixed recording medium recording portion 16. The fixed recording medium recording portion 16 stores the position information detected by the position detection portion 155 into the fixed recording medium.

In the access authentication processing, the access authentication portion 161 reads out the position information stored in the fixed recording medium. The position detection portion 155 then detects the position on the optical disk OD of the RFID tag 3, and outputs the detected position information to the access authentication portion 161. The access authentication portion 161 then judges whether the detected position coincides with the position information read out from the fixed recording medium. Upon judging that the detected position coincides with the position information read out from the fixed recording medium, the access authentication portion 161 permits access to the optical disk OD.

In this case, for the optical disk OD on which the RFID tag 3 is laminated, access is permitted only to a specific information recording/playback device. The invention is therefore effective, for example, when an optical disk OD having recorded highly confidential information is played by a specific information recording/playback device alone. The invention is thus applicable to information security in companies or the like.

As has been described, the position on the optical disk OD of the RFID tag 3 provided to the optical disk OD is detected, and the detected position on the optical disk OD of the RFID tag 3 is stored as the position information.

Because the position on the optical disk OD of the RFID tag 3 provided to the optical disk OD is detected and the detected position on the optical disk OD of the RFID tag 3 is stored as the position information, by using this position information in the access authentication for the optical disk OD, it is possible to prevent illegal copying of the information recorded in the optical disk OD. For example, even when the RFID tag 3 provided to the optical disk OD is removed and laminated to another optical disk having stored a copy of the information recorded in the optical disk OD, access to the optical disk fails unless the laminated position coincides with the position information stored in the RFID tag 3. It is thus possible to prevent illegal copying of the information recorded in the optical disk OD.

It should be appreciated that the concrete embodiments described above chiefly include inventions having the configurations as follows.

A position detection device according to one aspect of the invention includes position detection means for detecting a position on a recording medium of an information storage device provided to the recording medium, and position information writing means for writing the position on the recording medium of the information storage device detected by the position detection means into the information storage device as position information.

A position detection method according to another aspect of the invention includes a position detecting step of detecting a position on a recording medium of an information storage device provided to the recording medium, and a position information writing step of writing the position on the recording medium of the information storage device detected in the position detecting step into the information storage device as position information.

According to these configurations, the position on the recording medium of the information storage device provided to the recording medium is detected, and the detected position on the recording medium of the information storage device is written into the information storage device as the position information.

Because the position on the recording medium of the information storage device provided to the recording medium is detected and the detected position on the recording medium of the information storage device is written into the information storage device as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

A position detection device according to still another aspect of the invention includes position detection means for detecting a position on a recording medium of an information storage device provided to the recording medium, and position information storage means for storing the position on the recording medium of the information storage device detected by the position detection means as position information.

According to this configuration, the position on the recording medium of the information storage device provided to the recording medium is detected, and the detected position on the recording medium of the information storage device is stored as the position information.

Because the position on the recording medium of the information storage device provided to the recording medium is detected and the detected position on the recording medium of the information storage device is stored as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

It is preferable for the position detection device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident, and that the position detection means includes: focus error signal detection means for detecting a focus error signal by irradiating a laser beam from the label surface; traverse position storage means for storing, as a traverse position, a position at which the focus error signal detected by the focus error signal detection means differs from at other positions; and track position detection means for detecting a track position at the traverse position by irradiating a laser beam from the recording surface and by moving the optical head to the traverse position stored in the traverse position storage means.

According to this configuration, the recording medium includes an optical disk into/from which optical recording information is recorded and/or played back with the use of a laser beam emitted from the optical head, and the information storage device is laminated to the optical disk on the label surface opposing the recording surface on which a laser beam goes incident. A laser beam is irradiated from the label surface to detect a focus error signal, and a position at which the detected focus error signal differs from at other positions is stored as the traverse position. Thereafter, a track position at the traverse position is detected by irradiating a laser beam from the recording surface and by moving the optical head to the stored traverse position.

Hence, in a case where a laser beam is irradiated to the label surface on which the information storage device is laminated, the focus position is shifted by a quantity comparable to the information storage device, and the focus error signal is detected. The position at which the information storage device is laminated onto the optical disk can be thus detected by storing the traverse position at which the focus error signal was detected, and by irradiating a laser beam to the recording surface and moving the optical head to the stored traverse position to detect the track position on the recording medium.

It is preferable for the position detection device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident and configured to transmit specific radio waves, and that the position detection means includes: reception means, provided to the optical head, for receiving the radio waves transmitted from the information storage device; and address detection means for detecting an address of a position at which strength of the radio waves received at the reception means reaches a maximum by moving the optical head.

According to this configuration, the recording medium includes an optical disk into/from which optical recording information is recorded and/or played back with the use of a laser beam emitted from the optical head. Also, the information storage device is laminated to the optical disk on the label surface opposing the recording surface on which a laser beam goes incident. Further, specific radio waves are transmitted from the information storage device, and the radio waves transmitted from the information storage device are received at the reception means provided to the optical head. The optical head is moved to detect the address of a position at which strength of the radio waves received at the reception means reaches the maximum.

Hence, by receiving the radio waves transmitted from the information storage device to detect the address of a position on the optical disk at which strength of the radio waves reaches the maximum by moving the optical head, it is possible to detect the position at which the information storage device is laminated onto the optical disk.

It is preferable for the position detection device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident and configured to transmit radio waves in response to reception of a laser beam, and that the position detection means includes: reception means for receiving the radio waves transmitted from the information storage device; and address detection means for detecting an address at an instant of reception of the radio waves at the reception means by moving the optical head.

According to this configuration, the recording medium includes an optical disk into/from which optical recording information is recorded and/or played back with the use of a laser beam emitted from the optical head. Also, the information storage device is laminated to the optical disk on the label surface opposing the recording surface on which a laser beam goes incident. Further, radio waves are transmitted from the information storage device in response to reception of a laser beam, and the radio waves transmitted from the information storage device are received at the reception means. The optical head is then moved to detect the address at the instant of reception of the radio waves at the reception means.

Because the information storage device transmits radio waves in response to reception of a laser beam, it is possible to detect the position at which the information storage device is laminated onto the optical disk by detecting the address on the optical disk at the instant of reception of the radio waves transmitted from the information storage device.

It is preferable for the position detection device described above that the information storage device includes photo detection means for detecting a laser beam, and transmission means for transmitting radio waves upon detection of a laser beam by the photo detection means. According to this configuration, because radio waves are outputted upon detection of a laser beam having passed through the optical disk, it is possible to detect the position at which the information storage device is laminated onto the optical disk by detecting the address on the optical disk at the instant of reception of the radio waves transmitted from the information storage device by moving the optical head.

It is preferable for the position detection device described above that the information storage device includes heat detection means for detecting heat generated by irradiation of a laser beam onto the optical disk, and transmission means for transmitting radio waves upon detection of the heat by the heat detection means. According to this configuration, because the radio waves are outputted upon detection of heat generated by irradiation of a laser beam onto the optical disk, it is possible to detect the position at which the information storage device is laminated onto the optical disk by detecting the address on the optical disk at the instant of reception of the radio waves transmitted from the information storage device by moving the optical head.

It is preferable for the position detection device described above that: the recording medium includes an optical disk into/from which optical recording information is recorded and/or played back with the use of a laser beam emitted from an optical head; the information storage device is laminated to the optical disk on a recording surface on which a laser beam goes incident; and the position detection means includes address detection means for detecting an address at which playback fails by playing the optical disk.

According to this configuration, the recording medium includes an optical disk into/from which optical recording information is recorded and/or played back with the use of a laser beam emitted from the optical head, and the information storage device is laminated to the optical disk on the recording surface on which a laser beam goes incident. An address at which the playback fails is then detected by playing the optical disk.

Because the information storage device is laminated to the optical disk on the recording surface on which a laser beam goes incident, it is possible to detect the position at which the information storage device is laminated onto the optical disk by detecting the address of a region where the playback fails when the optical disk is played.

An access authentication device according to still another aspect of the invention is an access authentication device that authenticates access to a recording medium provided with an information storage device, and the information storage device has stored position information specifying a position on the recording medium at which the information storage device is disposed. The access authentication device includes: position detection means for detecting the position on the recording medium at which the information storage device is disposed; position information read means for reading out the position information from the information storage device; judgment means for judging whether the position detected by the position detection means coincides with the position information read out by the position information read means; and access permission means for permitting access to the recording medium when it is judged that the detected position coincides with the position information that has been read out.

An access authentication method according to still another aspect of the invention is an access authentication method for authenticating access to a recording medium provided with an information storage device, and the information storage device has stored position information specifying a position on the recording medium at which the information storage device is disposed. The access authentication method includes: a position detecting step of detecting the position on the recording medium at which the information storage device is disposed; a position information reading step of reading out the position information from the information storage device; a judging step of judging whether the position detected in the position detecting step coincides with the position information read out in the position information reading step; and an access permitting step of permitting access to the recording medium when it is judged that the detected position coincides with the position information that has been read out.

According to these configurations, the information storage device has stored the position information specifying the position on the recording medium at which the information storage device is disposed. The position on the recording medium at which the information storage device is disposed is detected and the position information is read out from the information storage device. Whether the detected position coincides with the position information that has been read out is judged. When it is judged that the detected position coincides with the position information that has been read out, access to the recording medium is permitted.

Because access to the recording medium is not permitted when it is judged that the detected position does not coincide with the position information that has been read out, for example, even when the information storage device provided to the recording medium is removed and laminated to another recording medium having stored a copy of the information recorded in the recording medium, access to the recording medium fails unless the laminated position coincides with the position information. It is thus possible to prevent illegal copying of the information recorded in the recording medium.

It is preferable for the access authentication device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident and has stored position information specifying a track position on the optical disk at which the information storage device is laminated onto the optical disk, and that the position detection means includes: focus error signal detection means for detecting a focus error signal by irradiating a laser beam from the label surface; traverse position storage means for storing, as a traverse position, a position at which the focus error signal detected by the focus error signal detection means differs from at other positions; and track position detection means for detecting the track position at the traverse position by irradiating a laser beam from the recording surface and by moving the optical head to the traverse position stored in the traverse position storage means.

According to this configuration, the recording medium includes an optical disk into/from which optical recording information is recorded and/or played back with the use of a laser beam emitted from the optical head, and the information storage device is laminated to the optical disk on the label surface opposing the recording surface on which a laser beam goes incident and has stored position information specifying a track position on the optical disk at which the information storage device is laminated onto the optical disk. A laser beam is irradiated from the label surface to detect a focus error signal, and a position at which the detected focus error signal differs from at other positions is stored as the traverse position. Thereafter, a track position at the traverse position is detected by irradiating a laser beam from the recording surface and by moving the optical head to the traverse position stored in the traverse position storage means.

Hence, in a case where a laser beam is irradiated to the label surface on which the information storage device is laminated, the focus position is shifted by a quantity comparable to the information storage device, and the focus error signal is detected. It is thus possible to detect the position at which the information storage device is laminated onto the optical disk by storing the traverse position at which the focus error signal was detected, and by irradiating a laser beam to the recording surface and moving the optical head to the stored traverse position to detect the track position on the recording medium.

It is preferable for the access authentication device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident while having stored position information specifying an address position on the optical disk at which the information storage device is laminated onto the optical disk and configured to transmit specific radio waves, and that the position detection means includes: reception means, provided to the optical head, for receiving the radio waves transmitted from the information storage device; and address detection means for detecting an address of a position at which strength of the radio waves received at the reception means reaches a maximum by moving the optical head.

According to this configuration, the recording medium includes an optical disk into/from which optical recording information is recorded and/or played back with the use of a laser beam emitted from the optical head. The information storage device is laminated to the optical disk on the label surface opposing the recording surface on which a laser beam goes incident and has stored position information specifying the address position on the optical disk at which the information storage device is laminated onto the optical disk. Further, specific radio waves are transmitted from the information storage device, and the radio waves transmitted from the information storage device are received at the reception means provided to the optical head. The optical head is moved to detect the address of a position at which strength of the radio waves received at the reception means reaches the maximum.

Hence, by receiving the radio waves transmitted from the information storage device to detect the address of a position on the optical disk at which the strength of the radio waves reaches the maximum while moving the optical head, it is possible to detect the position at which the information storage device is laminated onto the optical disk.

It is preferable for the access authentication device described above that: the recording medium includes an optical disk into/from which optical recording information is recorded and/or played back with the use of a laser beam emitted from an optical head; and the information storage device is laminated to the optical disk on a label surface opposing a recording surface on which a laser beam goes incident while having stored position information specifying an address position on the optical disk at which the information storage device is laminated onto the optical disk and configured to transmit radio waves in response to reception of a laser beam, and that the position detection means includes: reception means for receiving the radio waves transmitted from the information storage device; and address detection means for detecting an address at an instant of reception of the radio waves at the reception means by moving the optical head.

According to this configuration, the recording medium includes an optical disk into/from which optical recording information is recorded and/or played back with the use of a laser beam emitted from the optical head. Also, the information storage device is laminated to the optical disk on the label surface opposing the recording surface on which a laser beam goes incident and has stored the position information specifying the address position on the optical disk at which the information storage device is laminated onto the optical disk. Further, radio waves are transmitted from the information storage device in response to reception of a laser beam, and the radio waves transmitted from the information storage device are received at the reception means. The optical head is then moved to detect the address at the instant of reception of the radio waves at the reception means.

Because the information storage device transmits radio waves in response to reception of a laser beam, it is possible to detect the position at which the information storage device is laminated onto the optical disk by detecting the address on the optical disk at the instant of reception of the radio waves transmitted from the information storage device.

It is preferable for the access authentication device described above that the information storage device includes photo detection means for detecting a laser beam, and transmission means for transmitting radio waves upon detection of a laser beam by the photo detection means. According to this configuration, because radio waves are outputted upon detection of a laser beam having passed through the optical disk, it is possible to detect the position at which the information storage device is laminated onto the optical disk by detecting an address on the optical disk at the instant of reception of the radio waves transmitted from the information storage device while moving the optical head.

It is preferable for the access authentication device described above that the information storage device includes heat detection means for detecting heat generated by irradiation of a laser beam onto the optical disk, and transmission means for transmitting radio waves upon detection of the heat by the heat detection means. According to this configuration, because the radio waves are outputted upon detection of heat generated by irradiation of a laser beam onto the optical disk, it is possible to detect the position at which the information storage device is laminated onto the optical disk by detecting the address on the optical disk at the instant of reception of the radio waves transmitted from the information storage device while moving the optical head.

It is preferable for the access authentication device described above that: the recording medium includes an optical disk into/from which optical recording information is recorded and/or played back with the use of a laser beam emitted from an optical head; the information storage device is laminated to the optical disk on a recording surface on which a laser beam goes incident and has stored position information specifying an address position on the optical disk at which the information storage device is laminated onto the optical disk; and the position detection means includes address detection means for detecting an address at which playback fails by playing the optical disk.

According to this configuration, the recording medium includes an optical disk into/from which optical recording information is recorded and/or played back with the use of a laser beam emitted from the optical head, and the information storage device is laminated to the optical disk on the recording surface on which a laser beam goes incident and has stored position information specifying the address position on the optical disk at which the information storage device is laminated onto the optical disk. An address at which the playback fails is detected by playing the optical disk.

Because the information storage device is laminated to the optical disk on the recording surface on which a laser beam goes incident, it is possible to detect the position at which the information storage device is laminated onto the optical disk by detecting the address of a region where the playback fails when the optical disk is played.

An information storage device according to still another aspect of the invention includes position information acquisition means for acquiring position information detected by a position detection device that detects a position on a recording medium of the information storage device laminated onto the recording medium from the position detection device, and position information storage means for storing the position information acquired by the position information acquisition means.

According to this configuration, the position information detected by the position detection device that detects the position on the recording medium of the information storage device laminated onto the recording medium is acquired from the position detection device, and the acquired position information is stored.

Because the position on the recording medium of the information storage device provided to the recording medium is stored in the information storage device as the position information, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

An optical disk according to still another aspect of the invention has an information storage device that is embedded therein at a pre-set position; and the information storage device includes position information storage means for having previously stored position information on the optical disk of the information storage device.

According to this configuration, because the information storage device is embedded in the optical disk at the pre-set position, and the information storage device has previously stored the position information on the optical disk of the information storage device, by using this position information in the access authentication for the optical disk, it is possible to prevent illegal copying of the information recorded in the optical disk. For example, when the information recorded in an optical disk, in which the information storage device is embedded, is copied into another optical disk and an attempt is made to access the copied optical disk, access to the optical disk fails because the information storage device is not embedded therein. It is thus possible to prevent illegal copying of the information recorded in the optical disk.

It is preferable for the optical disk described above that plural recording layers are included, and that the information storage device is disposed to one recording layer among the plural recording layers.

According to this configuration, because plural recording layers are included and the information storage device is disposed to one recording layer among these plural recording layers, by using this position information in the access authentication for any other recording layer, it is possible to prevent illegal copying of the information recorded in the optical disk. For example, when the information recorded in the optical disk, in which the information storage device is embedded in one recording layer among plural recording layers, is copied into another optical disk and an attempt is made to access any other recording layer in the copied optical disk, access to any other recording layer in the copied optical disk fails because the information storage device is not embedded in one recording layer. It is thus possible to prevent illegal copying of the information recorded in the optical disk.

A position detection control device according to still another aspect of the invention includes position detection instruction means for providing an instruction to detect a position on a recording medium of an information storage device provided to the recording medium, and position information writing instruction means for providing an instruction to write the position on the recording medium of the information storage device detected according to the instruction into the information storage device as position information.

A position detection control method according to still another aspect of the invention includes a position detection instructing step of providing an instruction to detect a position on a recording medium of an information storage device provided to the recording medium, and a position information writing instructing step of providing an instruction to write the position on the recording medium of the information storage device detected according to the instruction into the information storage device as position information.

A position detection control program according to still another aspect of the invention causes a computer to function as position detection instruction means for providing an instruction to detect a position on a recording medium of an information storage device provided to the recording medium, and position information writing instruction means for providing an instruction to write the position on the recording medium of the information storage device detected according to the instruction into the information storage device as position information.

According to these configurations, an instruction to detect the position on the recording medium of the information storage device provided to the recording medium is provided, and an instruction to write the detected position on the recording medium of the information storage device into the information storage device as the position information is provided.

Because an instruction to detect the position on the recording medium of the information storage device provided to the recording medium is provided and an instruction to write the detected position on the recording medium of the information storage device into the information storage device as the position information is provided, by using this position information in the access authentication for the recording medium, it is possible to prevent illegal copying of the information recorded in the recording medium. For example, even when the information storage device provided to the recording medium is removed and laminated to another recording medium having stored a copy of the information recorded in the recording medium, access to the recording medium fails unless the laminated position coincides with the position information stored in the information storage device. It is thus possible to prevent illegal copying of the information recorded in the recording medium.

An access authentication control device according to still another aspect of the invention is an access authentication control device that authenticates access to a recording medium provided with an information storage device, and the information storage device has stored position information specifying a position on the recording medium at which the information storage device is disposed. The access authentication control device includes: detected position input means into which is inputted a detected position when the position on the recording medium at which the information storage device is disposed is detected; position information input means into which is inputted the position information read out from the information storage device; judgment means for judging whether the detected position inputted into the detected position input means coincides with the position information inputted into the position information input means; and access permission means for permitting access to the recording medium when it is judged that the detected position coincides with the position information.

An access authentication control method according to still another aspect of the invention is an access authentication control method for authenticating access to a recording medium provided with an information storage device, and the information storage device has stored position information specifying a position on the recording medium at which the information storage device is disposed. The access authentication control method includes: a detected position inputting step of inputting a detected position when the position on the recording medium at which the information storage device is disposed is detected; a position information inputting step of inputting the position information read out from the information storage device; a judging step of judging whether the detected position inputted in the detected position inputting step coincides with the position information inputted in the position information inputting step; and an access permitting step of permitting access to the recording medium when it is judged that the detected position coincides with the position information in the judging step.

An access authentication control program according to still another aspect of the invention is an access authentication control program for authenticating access to a recording medium provided with an information storage device, and the information storage device has stored position information specifying a position on the recording medium at which the information storage device is disposed. The access authentication control program causes a computer to function as follows: detected position input means into which is inputted a detected position when the position on the recording medium at which the information storage device is disposed is detected; position information input means into which is inputted the position information read out from the information storage device; judgment means for judging whether the detected position inputted into the detected position input means coincides with the position information inputted into the position information input means; and access permission means for permitting access to the recording medium when the judgment means judges that the detected position coincides with the position information.

According to these configurations, the information storage device has stored the position information specifying the position on the recording medium at which the information storage device is disposed. The position on the recording medium at which the information storage device is disposed is detected, and the detected position is inputted. Subsequently, the position information read out from the information storage device is inputted. Whether the detected position coincides with the position information is judged, and when it is judged that the detected position coincides with the position information, access to the recording medium is permitted.

Because access to the recording medium is not permitted when the detected position does not coincide with the position information, for example, even when the information storage device provided to the recording medium is removed and laminated to another recording medium having stored a copy of the information recorded in the recording medium, access to the recording medium fails unless the laminated position coincides with the position information. It is thus possible to prevent illegal copying of the information recorded in the recording medium.

INDUSTRIAL APPLICABILITY

A position detection device, a position detection method, a position detection control device, a position detection control method, a position detection control program, an access authentication device, an access authentication method, an access authentication control device, an access authentication control method, an access authentication control program, an information storage device, and an optical disk of the invention make it possible to prevent illegal copying of the information recorded in a recording medium. They are useful as a position detection device, a position detection method, a position detection control device, a position detection control method, and a position detection control program to detect the position of an information storage device provided to the recording medium, as an access authentication device, an access authentication method, an access authentication control device, an access authentication control method, and an access authentication control program to authenticate access to the recording medium provided with the information storage device, as an information storage device provided to a recording medium, as an optical disk into/from which optical recording information is recorded and/or played back with the use of a laser beam emitted from the optical head, and so forth.

A recording medium information access system of the invention is capable of preventing illegal copying of the information recorded in a recording medium, and is useful as a recording medium information access system for a recording medium into/from which information is recorded and/or played back.

The invention claimed is:

1. A position detection device comprising:
a position detection portion for detecting a position on a recording medium of a radio frequency ("RF") tag provided to the recording medium; and
a position information writing portion for writing the position on the recording medium of the RF tag detected by the position detection portion into the RF tag as position information.

2. A position detection device comprising:
a position detection portion for detecting a position on a recording medium of a radio frequency ("RF") tag provided to the recording medium; and
a position information storage portion for storing the position on the recording medium of the RF tag detected by the position detection portion as position information.

3. The position detection device according to claim 1,
wherein the recording medium includes an optical disk into which optical recording information is recorded and/or from which optical information is played back using a laser beam emitted from an optical head, the optical disk having a recording surface and a label surface opposing the recording surface,
wherein the RF tag is laminated to the optical disk on the label surface opposing the recording surface to which the laser beam is configured to be incident, and
wherein the position detection portion includes:
a focus error signal detection portion for detecting a focus error signal in response to a laser beam being irradiated from the label surface;
a traverse position storage portion for storing, as a traverse position, a position at which the focus error signal detected by the focus error signal detection portion differs from other positions; and
a track position detection portion for detecting a track position at the traverse position in response to a laser beam being irradiated from the recording surface and by moving the optical head to the traverse position stored in the traverse position storage portion.

4. The position detection device according to claim 1,
wherein the recording medium includes an optical disk into which optical recording information is recorded and/or from which optical recording information is played back using a laser beam emitted from an optical head, the optical disk having a recording surface and a label surface opposing the recording surface,
wherein the RF tag is laminated to the optical disk on the label surface opposing the recording surface to which the laser beam is configured to be incident,
wherein the RF tag is configured to transmit specific radio waves, and
wherein the position detection portion includes:
a reception portion, provided to the optical head, for receiving the specific radio waves transmitted from the RF tag; and
an address detection portion for detecting an address of a position at which a strength of the specific radio waves received by the reception portion reaches a maximum by moving the optical head.

5. The position detection device according to claim 1,
wherein the recording medium includes an optical disk into which optical recording information is recorded and/or from which optical recording information is played back using a laser beam emitted from an optical head, the optical disk having a recording surface and a label surface opposing the recording surface,
wherein the RF tag is laminated to the optical disk on the label surface opposing the recording surface to which the laser beam is configured to be incident,
wherein the RF tag is configured to transmit radio waves in response to reception of the laser beam, and
wherein the position detection portion includes:
a reception portion for receiving the radio waves transmitted from the RF tag; and
an address detection portion for detecting an address in response to reception of the radio waves by the reception portion by moving the optical head.

6. The position detection device according to claim 1,
wherein the recording medium includes an optical disk into which optical recording information is recorded and/or from which optical information is played back using a laser beam emitted from an optical head, the optical disk having a recording surface,
wherein the RF tag is laminated to the optical disk on the recording surface to which the laser beam is configured to be incident, and
wherein the position detection portion includes an address detection portion for detecting an address at which playback of the optical disk fails by playing the optical disk.

7. An access authentication device that authenticates access to a recording medium provided with a radio frequency ("RF") tag, the RF tag having stored position information specifying a position on the recording medium at which the RF tag is disposed, the access authentication device comprising:
   a position detection portion for detecting the position on the recording medium at which the RF tag is disposed;
   a position information read portion for reading out the position information from the RF tag;
   a judgment portion for judging whether the position detected by the position detection portion coincides with the position information read out by the position information read portion; and
   an access permission portion for permitting access to the recording medium when it is judged that the detected position coincides with the position information that has been read out.

8. The access authentication device according to claim 7,
   wherein the recording medium includes an optical disk into which optical recording information is recorded and/or from which optical recording information is played back using a laser beam emitted from an optical head, the optical disk having a recording surface and a label surface opposing the recording surface,
   wherein the RF tag is laminated to the optical disk on the label surface opposing the recording surface to which the laser beam is configured to be incident and has stored position information specifying a track position on the optical disk at which the RF tag is laminated onto the optical disk, and
   wherein the position detection portion includes:
   a focus error signal detection portion for detecting a focus error signal in response to a laser beam being irradiated from the label surface;
   a traverse position storage portion for storing, as a traverse position, a position at which the focus error signal detected by the focus error signal detection portion differs from other positions; and
   a track position detection portion for detecting the track position at the traverse position in response to a laser beam being irradiated from the recording surface and by moving the optical head to the traverse position stored in the traverse position storage portion.

9. The access authentication device according to claim 7,
   wherein the recording medium includes an optical disk into which optical recording information is recorded and/or from which optical information is played back using a laser beam emitted from an optical head, the optical disk having a recording surface and a label surface opposing the recording surface,
   wherein the RF tag is laminated to the optical disk on the label surface opposing the recording surface to which the laser beam is configured to be incident, and has stored position information specifying an address position on the optical disk at which the RF tag is laminated onto the optical disk,
   wherein the RF tag is configured to transmit specific radio waves, and
   wherein the position detection portion includes:
   a reception portion, provided to the optical head, for receiving the specific radio waves transmitted from the RF tag; and
   an address detection portion for detecting an address of a position at which a strength of the specific radio waves received by the reception portion reaches a maximum by moving the optical head.

10. The access authentication device according to claim 7,
    wherein the recording medium includes an optical disk into which optical recording information is recorded and/or from which optical recording information is played back using a laser beam emitted from an optical head, the optical disk having a recording surface and a label surface opposing the recording surface,
    wherein the RF tag is laminated to the optical disk on the label surface opposing the recording surface to which the laser beam is configured to be incident, and has stored position information specifying an address position on the optical disk at which the RF tag is laminated onto the optical disk,
    wherein the RF tag is configured to transmit radio waves in response to reception of the laser beam, and
    wherein the position detection portion includes:
    a reception portion for receiving the radio waves transmitted from the RF tag; and
    an address detection portion for detecting an address in response to reception of the radio waves by the reception portion by moving the optical head.

11. The access authentication device according to claim 7,
    wherein the recording medium includes an optical disk into which optical recording information is recorded and/or from which optical information is played back using a laser beam emitted from an optical head, the optical disk having a recording surface,
    wherein the RF tag is laminated to the optical disk on the recording surface to which the laser beam is configured to be incident, and has stored position information specifying an address position on the optical disk at which the RF tag is laminated onto the optical disk, and
    wherein the position detection portion includes an address detection portion for detecting an address at which playback of the optical disk fails by playing the optical disk.

12. A position detection method, comprising:
    a position detecting step of detecting a position on a recording medium of a radio frequency ("RF") tag provided to the recording medium; and
    a position information writing step of writing the position on the recording medium of the RF tag detected in the position detecting step into the RF tag as position information.

13. An access authentication method for authenticating access to a recording medium provided with a radio frequency ("RF") tag, the RF tag having stored position information specifying a position on the recording medium at which the RF tag is disposed, the access authentication method comprising:
    a position detecting step of detecting the position on the recording medium at which the RF tag is disposed;
    a position information reading step of reading out the position information from the RF tag;
    a judging step of judging whether the position detected in the position detecting step coincides with the position information read out in the position information reading step; and
    an access permitting step of permitting access to the recording medium when the judging step judges that the detected position coincides with the position information that has been read out.

14. A position detection control device comprising:
    a position detection instruction portion for providing an instruction to detect a position on a recording medium of a radio frequency ("RF") tag provided to the recording medium; and a position information writing instruction portion for providing an instruction to write the position on the recording medium of the RF tag detected according to the instruction into the RF tag as position information.

15. A position detection control method comprising:
- a position detection instructing step of providing an instruction to detect a position on a recording medium of a radio frequency ("RF") tag provided to the recording medium; and
- a position information writing instructing step of providing an instruction to write the position on the recording medium of the RF tag detected according to the instruction into the RF tag as position information.

16. A non-transitory computer-readable recording medium having recorded thereon a position detection control program that when executed causes a computer to function as follows:
- a position detection instruction portion for providing an instruction to detect a position on a recording medium of a radio frequency ("RF") tag provided to the recording medium; and
- a position information writing instruction portion for providing an instruction to write the position on the recording medium of the RF tag detected according to the instruction into the RF tag as position information.

17. An access authentication control device that authenticates access to a recording medium provided with a radio frequency ("RF") tag, the RF tag having stored position information specifying a position on the recording medium at which the RF tag is disposed, the access authentication control device comprising:
- a detected position input portion into which is inputted a detected position when the position on the recording medium at which the RF tag is disposed is detected;
- a position information input portion into which is inputted the position information read out from the RF tag;
- a judgment portion for judging whether the detected position inputted into the detected position input portion coincides with the position information inputted into the position information input portion; and
- an access permission portion for permitting access to the recording medium when the judgment portion judges that the detected position coincides with the position information.

18. An access authentication control method for authenticating access to a recording medium provided with a radio frequency ("RF") tag, the RF tag having stored position information specifying a position on the recording medium at which the RF tag is disposed, the access authentication control method comprising:
- a detected position inputting step of inputting a detected position when the position on the recording medium at which the RF tag is disposed is detected;
- a position information inputting step of inputting the position information read out from the RF tag;
- a judging step of judging whether the detected position inputted in the detected position inputting step coincides with the position information inputted in the position information inputting step; and
- an access permitting step of permitting access to the recording medium when the judging step judges that the detected position coincides with the position information.

19. A non-transitory computer-readable recording medium having recorded thereon an access authentication control program for authenticating access to a recording medium provided with a radio frequency ("RF") tag, wherein the RF tag has stored position information specifying a position on the recording medium at which the RF tag is disposed, and wherein when executed, the access authentication control program causes a computer to function as follows:
- a detected position input portion into which is inputted a detected position when the position on the recording medium at which the RF tag is disposed is detected;
- a position information input portion into which is inputted the position information read out from the RF tag;
- a judgment portion for judging whether the detected position inputted into the detected position input portion coincides with the position information inputted into the position information input portion; and
- an access permission portion for permitting access to the recording medium when the judgment portion judges that the detected position coincides with the position information.

* * * * *